US012709060B2

(12) United States Patent
Starikov et al.

(10) Patent No.: US 12,709,060 B2
(45) Date of Patent: Aug. 18, 2026

(54) 3D PRINTER WITH THE ABILITY TO PRINT COMPOSITE PLASTICS AND PLASTIC METAL AND PLASTIC CERAMICS COMPOUNDS THROUGH ADDITIVE MANUFACTURING

(71) Applicant: AE Intellectual Property Ltd., Limassol (CY)

(72) Inventors: Andrey P. Starikov, Tbilisi (GE); Pavel A. Kornedyasev, Tbilisi (GE); Kyrill A. Vybornov, Tbilisi (GE); Alexander A. Avetisyan, Tbilisi (GE); Maxim P. Boldyrev, Tbilisi (GE); Rasul M. Kishov, Tbilisi (GE); Eldar M. Urmancheev, Tbilisi (GE); Aleksandr F. Iugov, Tbilisi (GE); Eugene V. Shulga, Tbilisi (GE); Egor N. Ashcheulov, Tbilisi (GE)

(73) Assignee: AE Intellectual Property Ltd., Limassol (CY)

( * ) Notice: Subject to any disclaimer, the term of this patent is extended or adjusted under 35 U.S.C. 154(b) by 90 days.

(21) Appl. No.: 18/941,516

(22) Filed: Nov. 8, 2024

(65) Prior Publication Data

US 2025/0153437 A1 May 15, 2025

Related U.S. Application Data

(60) Provisional application No. 63/601,510, filed on Nov. 21, 2023, provisional application No. 63/597,545, filed on Nov. 9, 2023.

(51) Int. Cl.

*B29C 64/25* (2017.01)
*B29C 64/118* (2017.01)

(Continued)

(52) U.S. Cl.

CPC ............ *B29C 64/25* (2017.08); *B29C 64/118* (2017.08); *B29C 64/245* (2017.08); *B29C 64/295* (2017.08); *B29C 64/329* (2017.08); *B29C 64/35* (2017.08); *B29C 64/393* (2017.08); *B33Y 10/00* (2014.12); *B33Y 30/00* (2014.12)

(58) Field of Classification Search

None

See application file for complete search history.

(56) References Cited

U.S. PATENT DOCUMENTS 7,285,234 B2 10/2007 Pfeifer et al.
7,766,641 B2 8/2010 Silverbrook (Continued)

FOREIGN PATENT DOCUMENTS

AU 2014274824 A1 12/2015
AU 2014274824 B2 2/2018

(Continued)

OTHER PUBLICATIONS

International Search Report and Written Opinion for Application No. PCT/IB2024/061122, mailed on Apr. 25, 2025, 20 pages.

*Primary Examiner* — Yung-Sheng M Tsui
(74) *Attorney, Agent, or Firm* — DLA Piper LLP (US)

(57) ABSTRACT

A 3D printer can include a frame, at least one panel removably coupled to the frame and defining a printing enclosure, a heated build chamber within the printing enclosure, and a heated print bed defining a bottom of the heated build chamber.

12 Claims, 21 Drawing Sheets

(51) Int. Cl.

| | |
|---|---|
| ***B29C 64/245*** | (2017.01) |
| ***B29C 64/295*** | (2017.01) |
| ***B29C 64/329*** | (2017.01) |
| ***B29C 64/35*** | (2017.01) |
| ***B29C 64/393*** | (2017.01) |
| ***B33Y 10/00*** | (2015.01) |
| ***B33Y 30/00*** | (2015.01) |

(56) References Cited

U.S. PATENT DOCUMENTS

| | | | |
|---|---|---|---|
| 7,797,071 | B2 | 9/2010 | Silverbrook |
| 8,454,345 | B2 | 6/2013 | Silverbrook |
| 9,126,367 | B1 | 9/2015 | Mark et al. |
| 9,186,846 | B1 | 11/2015 | Mark et al. |
| 9,193,110 | B2 | 11/2015 | Pridoehl et al. |
| 9,327,453 | B2 | 5/2016 | Mark et al. |
| 9,339,972 | B2 | 5/2016 | Gordon |
| 9,370,896 | B2 | 6/2016 | Mark |
| 9,440,398 | B2 | 9/2016 | Lin |
| 9,456,884 | B2 | 10/2016 | Uckelmann et al. |
| 9,579,851 | B2 | 2/2017 | Mark et al. |
| 9,688,020 | B2 | 6/2017 | Teken et al. |
| 9,751,260 | B2 | 9/2017 | Dietrich et al. |
| 9,855,706 | B2 | 1/2018 | Din et al. |
| 9,878,492 | B2 | 1/2018 | Kanada |
| 9,895,872 | B2 | 2/2018 | Din et al. |
| 9,914,262 | B2 | 3/2018 | Voris et al. |
| 9,919,510 | B2 | 3/2018 | Inamura et al. |
| 9,925,722 | B2 | 3/2018 | Martin |
| 9,931,784 | B2 | 4/2018 | Kline |
| 9,937,668 | B2 | 4/2018 | Chi et al. |
| 9,956,725 | B2 | 5/2018 | Mark et al. |
| 9,956,727 | B2 | 5/2018 | Steele |
| 9,964,944 | B2 | 5/2018 | Adair et al. |
| 9,969,153 | B2 | 5/2018 | Meisner et al. |
| 9,981,312 | B2 | 5/2018 | Mackie et al. |
| 9,993,995 | B2 | 6/2018 | Jacobs et al. |
| 10,040,252 | B2 | 8/2018 | Mark |
| 10,052,814 | B2 | 8/2018 | Albert et al. |
| 10,059,062 | B2 | 8/2018 | Ederer et al. |
| 10,063,529 | B2 | 8/2018 | Milazzo et al. |
| 10,065,354 | B2 | 9/2018 | O'Neil |
| 10,076,880 | B2 | 9/2018 | Page |
| 10,118,344 | B2 | 11/2018 | Fruth |
| 10,137,636 | B2 | 11/2018 | Meisner et al. |
| 10,144,178 | B2 | 12/2018 | Meisner et al. |
| 10,150,239 | B2 | 12/2018 | Ryan et al. |
| 10,150,249 | B2 | 12/2018 | Ryan et al. |
| 10,160,183 | B2 | 12/2018 | Jacobs et al. |
| 10,160,193 | B2 | 12/2018 | Nielsen-Cole et al. |
| 10,195,778 | B2 | 2/2019 | Wolf et al. |
| 10,245,784 | B2 | 4/2019 | Teken et al. |
| 10,252,336 | B2 | 4/2019 | Buller et al. |
| 10,259,044 | B2 | 4/2019 | Buller et al. |
| 10,286,452 | B2 | 5/2019 | Buller et al. |
| 10,293,591 | B2 | 5/2019 | Nielsen-Cole et al. |
| 10,300,651 | B2 | 5/2019 | Noorazar et al. |
| 10,343,387 | B2 | 7/2019 | Bostick et al. |
| 10,384,389 | B2 | 8/2019 | Contractor |
| 10,391,754 | B2 | 8/2019 | Hakkaku et al. |
| 10,406,751 | B2 | 9/2019 | Fulop et al. |
| 10,414,096 | B2 | 9/2019 | Yoshida et al. |
| 10,434,702 | B2 | 10/2019 | Mark et al. |
| 10,449,692 | B2 | 10/2019 | Balistreri et al. |
| 10,449,696 | B2 | 10/2019 | Elgar et al. |
| 10,456,836 | B2 | 10/2019 | Heikkila |
| 10,456,978 | B2 | 10/2019 | Costlow |
| 10,464,305 | B2 | 11/2019 | Inamura et al. |
| 10,471,697 | B2 | 11/2019 | Sieradzki et al. |
| 10,486,410 | B2 | 11/2019 | Van Der Zalm |
| 10,500,778 | B2 | 12/2019 | Shen et al. |
| 10,500,789 | B2 | 12/2019 | Fulop et al. |
| 10,501,869 | B2 | 12/2019 | Van Der Schaaf et al. |
| 10,532,512 | B2 | 1/2020 | Susnjara et al. |
| 10,538,099 | B2 | 1/2020 | Iio et al. |
| 10,548,695 | B2 | 2/2020 | Uckelmann et al. |
| 10,611,082 | B2 | 4/2020 | Mark et al. |
| 10,611,098 | B2 | 4/2020 | Stolyarov et al. |
| 10,632,720 | B2 | 4/2020 | Jacobs et al. |
| 10,656,626 | B2 | 5/2020 | Jacobs, II |
| 10,661,341 | B2 | 5/2020 | Romano et al. |
| 10,696,035 | B2 | 6/2020 | Bostick et al. |
| 10,710,308 | B2 | 7/2020 | Bloome |
| 10,710,374 | B2 | 7/2020 | Iio et al. |
| 10,714,249 | B2 | 7/2020 | Hegenbart et al. |
| 10,723,069 | B2 | 7/2020 | Prucha et al. |
| 10,723,072 | B1 | 7/2020 | Zeman et al. |
| 10,759,111 | B2 | 9/2020 | Fulop et al. |
| 10,766,181 | B2 | 9/2020 | Paranthaman et al. |
| 10,780,628 | B2 | 9/2020 | Padgett et al. |
| 10,795,340 | B2 | 10/2020 | Jacobs, II |
| 10,800,084 | B2 | 10/2020 | Stubenruss |
| 10,807,290 | B2 | 10/2020 | Luo et al. |
| 10,814,604 | B2 | 10/2020 | Tyler |
| 10,814,607 | B2 | 10/2020 | Van Tooren et al. |
| 10,821,662 | B2 | 11/2020 | Mark |
| 10,836,077 | B2 | 11/2020 | Andrews |
| 10,836,106 | B2 | 11/2020 | Gjovik et al. |
| 10,864,674 | B2 | 12/2020 | Adair et al. |
| 10,866,576 | B2 | 12/2020 | Jacobs, II |
| 10,870,149 | B2 | 12/2020 | Oftedal |
| 10,882,291 | B2 | 1/2021 | Dietrich et al. |
| 10,889,044 | B2 | 1/2021 | Batchelder et al. |
| 10,894,359 | B2 | 1/2021 | Gress et al. |
| 10,933,585 | B2 | 3/2021 | Ciscon et al. |
| 10,933,587 | B2 | 3/2021 | Hicks et al. |
| 10,940,643 | B2 | 3/2021 | Hicks et al. |
| 10,952,969 | B2 | 3/2021 | Albed Alhnan |
| 10,953,609 | B1 | 3/2021 | Mark |
| 10,960,606 | B2 | 3/2021 | Tarradas et al. |
| 10,975,529 | B2 | 4/2021 | Flitsch et al. |
| 10,981,373 | B2 | 4/2021 | Nielsen-Cole et al. |
| 10,988,603 | B2 | 4/2021 | Yuasa et al. |
| 10,994,480 | B2 | 5/2021 | Wolf et al. |
| 11,000,895 | B2 | 5/2021 | Heikkila |
| 11,000,996 | B2 | 5/2021 | Chen et al. |
| 11,001,004 | B2 | 5/2021 | Teken et al. |
| 11,014,268 | B2 | 5/2021 | Tseng et al. |
| 11,014,287 | B2 | 5/2021 | Costlow |
| 11,014,297 | B2 | 5/2021 | Robert |
| 11,045,426 | B2 | 6/2021 | Albed Alhnan et al. |
| 11,045,988 | B1 | 6/2021 | Molinari |
| 11,065,861 | B2 | 7/2021 | Mark et al. |
| 11,072,111 | B2 | 7/2021 | Blair |
| 11,084,212 | B2 | 8/2021 | Lopez Romano et al. |
| 11,104,058 | B2 | 8/2021 | Zinniel et al. |
| 11,110,540 | B2 | 9/2021 | Yang et al. |
| 11,110,696 | B2 | 9/2021 | Sieradzki et al. |
| 11,123,918 | B2 | 9/2021 | Prucha et al. |
| 11,123,919 | B2 | 9/2021 | Prucha et al. |
| 11,141,898 | B2 | 10/2021 | Jaehnicke |
| 11,141,901 | B2 | 10/2021 | Yuasa et al. |
| 11,167,477 | B1 | 11/2021 | Hays et al. |
| 11,186,035 | B2 | 11/2021 | Barnes et al. |
| 11,216,707 | B2 | 1/2022 | Anderson et al. |
| 11,225,029 | B2 | 1/2022 | Ederer et al. |
| 11,235,528 | B2 | 2/2022 | Sieradzki |
| 11,241,831 | B2 | 2/2022 | Schreiner |
| 11,247,387 | B2 | 2/2022 | Barclay et al. |
| 11,249,457 | B2 | 2/2022 | Jacobs, II et al. |
| 11,260,587 | B2 | 3/2022 | Jahnle et al. |
| 11,267,202 | B2 | 3/2022 | Swier et al. |
| 11,292,169 | B2 | 4/2022 | Laput et al. |
| 11,338,516 | B2 | 5/2022 | Schalk et al. |
| 11,370,172 | B2 | 6/2022 | Lopez et al. |
| 11,383,436 | B2 | 7/2022 | Ballard et al. |
| 11,396,112 | B2 | 7/2022 | Andrews |
| 11,400,641 | B2 | 8/2022 | Neboian et al. |
| 11,413,812 | B2 | 8/2022 | Beh et al. |
| 11,420,382 | B2 | 8/2022 | Mark et al. |
| 11,426,927 | B2 | 8/2022 | Otis, Jr. et al. |
| 11,440,251 | B2 | 9/2022 | Uckelmann et al. |
| 11,440,258 | B2 | 9/2022 | Haase et al. |
| 11,465,342 | B2 | 10/2022 | Schalk et al. |

(56) References Cited

U.S. PATENT DOCUMENTS 11,485,079 B2 11/2022 Durand et al.
11,485,090 B2 11/2022 Klimczak et al.
11,498,278 B2 11/2022 Alvarez et al.
11,504,773 B2 11/2022 Steeves et al.
11,505,902 B2 11/2022 Flitsch et al.
11,541,593 B2 1/2023 Lieberwirth et al.
11,548,199 B2 1/2023 Sternå et al.
11,548,213 B2 1/2023 Fastert et al.
11,548,225 B2 1/2023 Petros et al.
11,554,543 B2 1/2023 Halperin et al.
11,577,462 B2 2/2023 Mark
11,577,469 B2 2/2023 Lan et al.
11,613,019 B2 3/2023 Nielsen-Cole
11,622,940 B2 4/2023 Albed Alhnan
11,633,914 B2 4/2023 Hunt et al.
11,639,027 B2 5/2023 Lawless et al.
11,640,156 B2 5/2023 Jacobs
2004/0173946 A1 9/2004 Pfeifer et al.
2004/0182510 A1 9/2004 Pfeifer et al.
2007/0208448 A1 9/2007 Silverbrook
2007/0252871 A1 11/2007 Silverbrook
2010/0278952 A1 11/2010 Silverbrook
2013/0108726 A1 5/2013 Uckelmann et al.
2014/0203479 A1 7/2014 Teken et al.
2014/0328963 A1 11/2014 Mark et al.
2014/0361460 A1 12/2014 Mark
2015/0037527 A1 2/2015 Jacobs et al.
2015/0048553 A1 2/2015 Dietrich et al.
2015/0069665 A1* 3/2015 Lee ........................ B29C 64/106
264/405
2015/0209978 A1* 7/2015 Snyder .................... B33Y 40/00
425/162
2015/0224718 A1 8/2015 Ederer et al.
2015/0231830 A1 8/2015 Tsai et al.
2015/0266243 A1 9/2015 Mark et al.
2015/0283763 A1 10/2015 Chi et al.
2015/0314527 A1 11/2015 Kline
2015/0314528 A1 11/2015 Gordon
2015/0314531 A1 11/2015 Mark et al.
2015/0314532 A1 11/2015 Gordon
2015/0375451 A1 12/2015 Voris et al.
2015/0375457 A1 12/2015 Mark et al.
2016/0016360 A1 1/2016 Voris et al.
2016/0016362 A1 1/2016 Kim et al.
2016/0031160 A1 2/2016 Din et al.
2016/0144564 A1 5/2016 Padgett et al.
2016/0144565 A1 5/2016 Mark et al.
2016/0144569 A1 5/2016 Martin
2016/0151968 A1 6/2016 Lin
2016/0158962 A1 6/2016 Balistreri et al.
2016/0167307 A1 6/2016 Eramian et al.
2016/0207263 A1 7/2016 Gordon
2016/0214327 A1 7/2016 Uckelmann et al.
2016/0221263 A1 8/2016 Din et al.
2016/0236407 A1 8/2016 Armani et al.
2016/0236408 A1 8/2016 Wolf et al.
2016/0236409 A1 8/2016 Armani et al.
2016/0288207 A1 10/2016 Gambardella
2016/0332228 A1 11/2016 Mackie et al.
2016/0361869 A1 12/2016 Mark et al.
2016/0368213 A1 12/2016 Mark
2016/0368218 A1 12/2016 Cruz et al.
2017/0001371 A1 1/2017 Sobue et al.
2017/0036403 A1 2/2017 Ruff et al.
2017/0050381 A1 2/2017 Minardi et al.
2017/0050388 A1 2/2017 Minardi et al.
2017/0056966 A1 3/2017 Myerberg et al.
2017/0057167 A1 3/2017 Van Tooren et al.
2017/0057173 A1 3/2017 Van Der Zalm
2017/0066873 A1* 3/2017 Gardet .................. B29C 64/118
2017/0071707 A1 3/2017 Uckelmann et al.
2017/0100896 A1 4/2017 Hakkaku et al.
2017/0120526 A1 5/2017 Zhang et al.
2017/0151715 A1 6/2017 Voris et al.
2017/0173892 A1 6/2017 Steele
2017/0190104 A1 7/2017 Bostick et al.
2017/0274595 A1 9/2017 Swartz et al.
2017/0279783 A1 9/2017 Milazzo et al.
2017/0291841 A1 10/2017 Inamura et al.
2017/0305139 A1 10/2017 Hartmann
2017/0320267 A1 11/2017 Lind et al.
2017/0320268 A1 11/2017 Teken et al.
2017/0326802 A1 11/2017 Mark et al.
2017/0329308 A1 11/2017 Tomasiak
2017/0355135 A1 12/2017 Tombs
2017/0355139 A1 12/2017 Wolf et al.
2017/0355153 A1 12/2017 Albert et al.
2017/0368816 A1 12/2017 Batchelder et al.
2018/0001548 A1 1/2018 Dietrich et al.
2018/0001553 A1 1/2018 Buller et al.
2018/0001556 A1 1/2018 Buller et al.
2018/0001557 A1 1/2018 Buller et al.
2018/0056391 A1 3/2018 Buller et al.
2018/0061543 A1 3/2018 Hegenbart et al.
2018/0079141 A1 3/2018 Yoshida et al.
2018/0111193 A1 4/2018 Romano et al.
2018/0111194 A1 4/2018 Buller et al.
2018/0111195 A1 4/2018 Romano et al.
2018/0111196 A1 4/2018 Brezoczky et al.
2018/0111197 A1 4/2018 Romano et al.
2018/0111198 A1 4/2018 Vitanov et al.
2018/0111319 A1 4/2018 Brezoczky et al.
2018/0126460 A1 5/2018 Murphree et al.
2018/0126461 A1 5/2018 Buller et al.
2018/0126462 A1 5/2018 Murphree et al.
2018/0126649 A1 5/2018 Romano et al.
2018/0126650 A1 5/2018 Murphree et al.
2018/0147826 A1 5/2018 Inamura et al.
2018/0154576 A1 6/2018 Chen et al.
2018/0154657 A1 6/2018 Iio et al.
2018/0169950 A1 6/2018 Meisner et al.
2018/0186071 A1 7/2018 Jaehnicke
2018/0194056 A1 7/2018 Van Der Zalm
2018/0201737 A1 7/2018 Bheda et al.
2018/0207856 A1 7/2018 Seriani
2018/0236713 A1 8/2018 Robert
2018/0253081 A1 9/2018 Jones et al.
2018/0281236 A1 10/2018 Elgar et al.
2018/0281237 A1 10/2018 Frechman et al.
2018/0281275 A1 10/2018 Laput et al.
2018/0281282 A1 10/2018 Elgar et al.
2018/0281283 A1 10/2018 Frechman et al.
2018/0281284 A1 10/2018 Elgar et al.
2018/0284726 A1 10/2018 Jacobs et al.
2018/0290194 A1 10/2018 Jabbari et al.
2018/0290365 A1 10/2018 Noorazar et al.
2018/0290429 A1 10/2018 Jacobs et al.
2018/0297278 A1 10/2018 Fulop et al.
2018/0297282 A1 10/2018 Paskevic
2018/0297284 A1 10/2018 Fulop et al.
2018/0304530 A1 10/2018 Nadvornik et al.
2018/0311169 A1 11/2018 Albed Alhnan
2018/0326644 A1 11/2018 Shen et al.
2018/0326654 A1 11/2018 Ederer et al.
2018/0335766 A1 11/2018 Jacobs, II
2018/0339453 A1 11/2018 DiNunzio
2018/0345563 A1 12/2018 Sternå et al.
2018/0345572 A1 12/2018 Mark et al.
2018/0345585 A1 12/2018 Ederer et al.
2018/0348738 A1 12/2018 Jacobs, II
2018/0370132 A1 12/2018 Chen et al.
2019/0011903 A1 1/2019 Jacobs, II
2019/0022942 A1 1/2019 Fulop et al.
2019/0030807 A1 1/2019 Ciscon et al.
2019/0030812 A1 1/2019 Branham et al.
2019/0055699 A1 2/2019 Flitsch et al.
2019/0061268 A1 2/2019 De Pena et al.
2019/0061278 A1 2/2019 Schamp et al.
2019/0070780 A1 3/2019 Sieradzki
2019/0077091 A1 3/2019 Wakayama et al.
2019/0091933 A1 3/2019 Barbati et al.
2019/0105838 A1 4/2019 Hicks et al.
2019/0105839 A1 4/2019 Hicks et al.
2019/0111630 A1 4/2019 Tarradas et al.

(56) References Cited

U.S. PATENT DOCUMENTS

2019/0111660 A1 4/2019 Jacobs et al.
2019/0118467 A1 4/2019 Neboian et al.
2019/0134903 A1 5/2019 De Pena et al.
2019/0134971 A1 5/2019 Nielsen-Cole et al.
2019/0134972 A1 5/2019 Kerrigan
2019/0143608 A1 5/2019 Ederer et al.
2019/0168451 A1 6/2019 Mark
2019/0176400 A1 6/2019 Petros et al.
2019/0184639 A1 6/2019 Lopez Romano et al.
2019/0184641 A1 6/2019 Swier et al.
2019/0217532 A1 7/2019 Schroeder et al.
2019/0224956 A1 7/2019 Bostick et al.
2019/0240904 A1 8/2019 Swanson et al.
2019/0240967 A1 8/2019 Luo et al.
2019/0263061 A1 8/2019 Gress et al.
2019/0275738 A1 9/2019 Teken et al.
2019/0291184 A1 9/2019 Buller et al.
2019/0308243 A1 10/2019 Gambardella
2019/0322047 A1* 10/2019 Riha ...................... B33Y 30/00
2019/0337282 A1 11/2019 Pridoehl et al.
2019/0351612 A1 11/2019 Huang et al.
2019/0366628 A1 12/2019 Guillory et al.
2019/0375007 A1 12/2019 Findley
2019/0388966 A1 12/2019 Gibson et al.
2020/0009660 A1 1/2020 Heikkila
2020/0024842 A1 1/2020 Criado
2020/0031110 A1 1/2020 Sieradzki et al.
2020/0039146 A1 2/2020 Jahnle et al.
2020/0039148 A1 2/2020 Jähnicke et al.
2020/0047417 A1 2/2020 Barbati et al.
2020/0061918 A1 2/2020 Branham et al.
2020/0070405 A1 3/2020 Barclay et al.
2020/0086652 A1 3/2020 Iio et al.
2020/0108443 A1 4/2020 Steeves et al.
2020/0114572 A1 4/2020 Hikmet et al.
2020/0130278 A1 4/2020 Swier et al.
2020/0139619 A1 5/2020 Prucha et al.
2020/0139693 A1 5/2020 Nielsen-Cole et al.
2020/0139695 A1 5/2020 Stallbaumer et al.
2020/0146994 A1 5/2020 Albed Alhnan et al.
2020/0156150 A1 5/2020 Ito
2020/0223121 A1 7/2020 Batchelder et al.
2020/0229905 A1 7/2020 Uckelmann et al.
2020/0230869 A1 7/2020 Stolyarov et al.
2020/0230887 A1 7/2020 Arao et al.
2020/0238625 A1 7/2020 Champion et al.
2020/0254689 A1 8/2020 Gjovik et al.
2020/0264585 A1 8/2020 Ryan
2020/0282659 A1 9/2020 Lan et al.
2020/0307069 A1 10/2020 Fastert et al.
2020/0324337 A1 10/2020 Lieberwirth et al.
2020/0324461 A1 10/2020 Mark et al.
2020/0324463 A1* 10/2020 Morgan ............... B23K 26/342
2020/0338824 A1 10/2020 Cardon et al.
2020/0346400 A1 11/2020 Prucha et al.
2020/0353676 A1 11/2020 Prucha et al.
2020/0361149 A1 11/2020 Arao et al.
2020/0368812 A1 11/2020 Trump et al.
2020/0376763 A1 12/2020 Harvey et al.
2020/0393814 A1 12/2020 Jacobs
2020/0398483 A1 12/2020 Snover Burton et al.
2020/0401103 A1 12/2020 Jacobs
2020/0406522 A1 12/2020 Lu et al.
2020/0406530 A1 12/2020 Hicks et al.
2020/0406548 A1* 12/2020 Yuwaki ................ B29C 64/106
2021/0015969 A1 1/2021 Zhang et al.
2021/0023774 A1 1/2021 Van Tooren et al.
2021/0039315 A1 2/2021 Ciscon et al.
2021/0046704 A1 2/2021 Huttunen et al.
2021/0094223 A1 4/2021 Blair
2021/0107225 A1 4/2021 Harvey et al.
2021/0114291 A1 4/2021 Halperin et al.
2021/0114299 A1 4/2021 Schreiner
2021/0124334 A1 4/2021 Pomish
2021/0133520 A1 5/2021 Anderson et al.
2021/0138722 A1 5/2021 Butragueno-Martinez et al.
2021/0154935 A1 5/2021 Haase et al.
2021/0162656 A1 6/2021 Beh et al.
2021/0162664 A1 6/2021 Raynes
2021/0169809 A1 6/2021 Albed Alhnan
2021/0178664 A1 6/2021 Schalk et al.
2021/0178667 A1 6/2021 Barnes et al.
2021/0178668 A1 6/2021 Schalk et al.
2021/0178688 A1 6/2021 Otis, Jr. et al.
2021/0187850 A1 6/2021 Sayers
2021/0197449 A1 7/2021 Otis, Jr. et al.
2021/0197469 A1 7/2021 Laws et al.
2021/0197471 A1 7/2021 Schalk et al.
2021/0197474 A1 7/2021 Alvarez et al.
2021/0197476 A1 7/2021 Ewald
2021/0206057 A1 7/2021 Schalk et al.
2021/0206078 A1 7/2021 Schalk et al.
2021/0206087 A1 7/2021 Geile et al.
2021/0206097 A1 7/2021 Schalk et al.
2021/0206099 A1 7/2021 Schalk et al.
2021/0206157 A1 7/2021 Nielsen-Cole et al.
2021/0214901 A1 7/2021 Flitsch et al.
2021/0221054 A1 7/2021 Mark
2021/0237349 A1 8/2021 Wolf et al.
2021/0260818 A1 8/2021 Lawless et al.
2021/0263500 A1 8/2021 Jacobs et al.
2021/0268712 A1 9/2021 Chen et al.
2021/0268720 A1 9/2021 Blair
2021/0276177 A1 9/2021 McRoberts
2021/0276255 A1 9/2021 Hernandez et al.
2021/0276260 A1 9/2021 Otis, Jr. et al.
2021/0283846 A1 9/2021 Otis, Jr. et al.
2021/0308941 A1 10/2021 Erickson et al.
2021/0331409 A1 10/2021 Lopez et al.
2021/0347121 A1 11/2021 Mansell et al.
2021/0353547 A1 11/2021 Albed Alhnan et al.
2021/0354368 A1 11/2021 Zinniel et al.
2021/0354386 A1 11/2021 Murciego Rodriguez et al.
2021/0369622 A1 12/2021 Albed Alhnan
2021/0370402 A1 12/2021 Bayramian et al.
2021/0370585 A1 12/2021 Prucha et al.
2021/0370600 A1 12/2021 Gjovik et al.
2021/0379815 A1 12/2021 Woellner Duarte Pereira et al.
2021/0380405 A1 12/2021 Hunyadi Murph et al.
2021/0387416 A1 12/2021 Mark
2022/0009162 A1 1/2022 Ballard et al.
2022/0016831 A1 1/2022 Waite et al.
2022/0032377 A1 2/2022 Hudelson et al.
2022/0048113 A1 2/2022 Rosenblatt et al.
2022/0048255 A1 2/2022 Iliopoulos et al.
2022/0063187 A1 3/2022 Chopra et al.
2022/0072785 A1 3/2022 Klimczak et al.
2022/0072794 A1 3/2022 Klimczak et al.
2022/0097305 A1 3/2022 Erickson et al.
2022/0097307 A1 3/2022 Erickson et al.
2022/0097308 A1 3/2022 Erickson et al.
2022/0098350 A1 3/2022 Cole et al.
2022/0118700 A1 4/2022 Hunt et al.
2022/0118702 A1 4/2022 Schreiner
2022/0134660 A1 5/2022 Kras et al.
2022/0143686 A1 5/2022 Knotts et al.
2022/0143909 A1 5/2022 Rodgers
2022/0152905 A1 5/2022 Minev et al.
2022/0168962 A1 6/2022 Avdeev et al.
2022/0176459 A1 6/2022 Ueno et al.
2022/0176628 A1 6/2022 Vasic et al.
2022/0193996 A1 6/2022 Durand et al.
2022/0203617 A1 6/2022 Pekic
2022/0203619 A1 6/2022 Ruiz Rivas et al.
2022/0203670 A1 6/2022 Vasic et al.
2022/0212409 A1 7/2022 Cardus Andreu et al.
2022/0227048 A1 7/2022 Huber et al.
2022/0227060 A1 7/2022 Klimczak et al.
2022/0242045 A1 8/2022 Beetz et al.
2022/0250321 A1 8/2022 Beetz et al.
2022/0257830 A1 8/2022 Zhang et al.
2022/0258247 A1 8/2022 Leard et al.
2022/0258462 A1 8/2022 Vasic et al.
2022/0266520 A1 8/2022 Schalk et al.

(56) References Cited

U.S. PATENT DOCUMENTS

| | | | |
|---|---|---|---|
| 2022/0274880 | A1 | 9/2022 | Pont et al. |
| 2022/0281177 | A1 | 9/2022 | Gu et al. |
| 2022/0297187 | A1 | 9/2022 | Buller et al. |
| 2022/0297389 | A1 | 9/2022 | Reinke |
| 2022/0305728 | A1 | 9/2022 | Ballard et al. |
| 2022/0324169 | A1 | 10/2022 | Guillory et al. |
| 2022/0332052 | A1 | 10/2022 | Tominaga et al. |
| 2022/0339822 | A1 | 10/2022 | Elgar et al. |
| 2022/0371278 | A1 | 11/2022 | Martin Vidal et al. |
| 2022/0388242 | A1 | 12/2022 | Uckelmann et al. |
| 2022/0396031 | A1 | 12/2022 | Murciego Rodriguez et al. |
| 2023/0001606 | A1 | 1/2023 | Clucas et al. |
| 2023/0013514 | A1 | 1/2023 | Kim |
| 2023/0014858 | A1 | 1/2023 | Demuth et al. |
| 2023/0016409 | A1 | 1/2023 | Govaerts |
| 2023/0028236 | A1 | 1/2023 | Leavitt et al. |
| 2023/0031850 | A1 | 2/2023 | Parrott |
| 2023/0054376 | A1 | 2/2023 | Flitsch et al. |
| 2023/0098602 | A1 | 3/2023 | Cella et al. |
| 2023/0109096 | A1 | 4/2023 | Cella et al. |
| 2023/0111065 | A1 | 4/2023 | Schumacher et al. |
| 2023/0111118 | A1 | 4/2023 | Raventós Sánchez et al. |
| 2023/0111429 | A1 | 4/2023 | Cella et al. |
| 2023/0114997 | A1 | 4/2023 | Cella et al. |
| 2023/0116685 | A1 | 4/2023 | Llamazares et al. |
| 2023/0118021 | A1 | 4/2023 | Petros et al. |
| 2023/0123663 | A1 | 4/2023 | Lieberwirth et al. |
| 2023/0132449 | A1 | 5/2023 | Cella et al. |
| 2023/0133696 | A1 | 5/2023 | Zhang et al. |
| 2025/0073996 | A1* | 3/2025 | Ruiz ..................... B29C 64/112 |
| 2025/0340015 | A1* | 11/2025 | Rohrmoser ........... B29C 64/118 |

FOREIGN PATENT DOCUMENTS

| | | | |
|---|---|---|---|
| AU | 2018203340 | A1 | 5/2018 |
| AU | 2017201867 | B2 | 6/2018 |
| AU | 2018203340 | B2 | 8/2019 |
| AU | 2019202860 | B1 | 11/2019 |
| AU | 2018363912 | A1 | 4/2020 |
| AU | 2018405397 | A1 | 9/2020 |
| AU | 2020257519 | A1 | 11/2021 |
| AU | 2020257980 | A1 | 11/2021 |
| AU | 2020259078 | A1 | 11/2021 |
| AU | 2020397799 | A1 | 7/2022 |
| AU | 2021216914 | A1 | 9/2022 |
| AU | 2021278997 | A1 | 12/2022 |
| AU | 2021290207 | B1 | 2/2023 |
| AU | 2022291433 | A1 | 2/2023 |
| AU | 2021266284 | B2 | 3/2023 |
| CA | 2914512 | A1 | 12/2014 |
| CA | 2911666 | A1 | 1/2015 |
| CA | 3088934 | A1 | 8/2019 |
| CA | 3118364 | A1 | 5/2020 |
| CA | 2911666 | C | 8/2020 |
| CA | 2914512 | C | 10/2020 |
| CA | 3136003 | A1 | 10/2020 |
| CA | 3134375 | A1 | 11/2020 |
| CA | 3137888 | A1 | 11/2020 |
| CA | 3143336 | A1 | 12/2020 |
| CA | 3020994 | C | 1/2021 |
| CA | 3158536 | A1 | 5/2021 |
| CA | 3169648 | A1 | 8/2021 |
| CA | 3185037 | A1 | 12/2021 |
| CA | 2957123 | C | 10/2022 |
| CN | 105278885 | A | 1/2016 |
| CN | 105291430 | A | 2/2016 |
| CN | 105291433 | A | 2/2016 |
| CN | 105934341 | A | 9/2016 |
| CN | 106042386 | A | 10/2016 |
| CN | 106273511 | A | 1/2017 |
| CN | 106393677 | A | 2/2017 |
| CN | 106444918 | A | 2/2017 |
| CN | 106476271 | A | 3/2017 |
| CN | 104972653 | B | 5/2017 |
| CN | 107116220 | A | 9/2017 |
| CN | 107160685 | A | 9/2017 |
| CN | 107250971 | A | 10/2017 |
| CN | 107463192 | A | 12/2017 |
| CN | 107991940 | A | 5/2018 |
| CN | 108073200 | A | 5/2018 |
| CN | 108153348 | A | 6/2018 |
| CN | 108472720 | A | 8/2018 |
| CN | 108602278 | A | 9/2018 |
| CN | 109072601 | A | 12/2018 |
| CN | 106273497 | B | 2/2019 |
| CN | 109940885 | A | 6/2019 |
| CN | 110312608 | A | 10/2019 |
| CN | 110394985 | A | 11/2019 |
| CN | 110687900 | A | 1/2020 |
| CN | 110869193 | A | 3/2020 |
| CN | 110891767 | A | 3/2020 |
| CN | 110958937 | A | 4/2020 |
| CN | 111002586 | A | 4/2020 |
| CN | 111067121 | A | 4/2020 |
| CN | 111266581 | A | 6/2020 |
| CN | 111376478 | A | 7/2020 |
| CN | 111590915 | A | 8/2020 |
| CN | 110687900 | B | 9/2020 |
| CN | 111633976 | A | 9/2020 |
| CN | 111741838 | A | 10/2020 |
| CN | 111823572 | A | 10/2020 |
| CN | 112089082 | A | 12/2020 |
| CN | 112114517 | A | 12/2020 |
| CN | 112477124 | A | 3/2021 |
| CN | 112829296 | A | 5/2021 |
| CN | 113276415 | A | 8/2021 |
| CN | 113316514 | A | 8/2021 |
| CN | 113365798 | A | 9/2021 |
| CN | 113423561 | A | 9/2021 |
| CN | 113562970 | A | 10/2021 |
| CN | 113741224 | A | 12/2021 |
| CN | 114002956 | A | 2/2022 |
| CN | 114103097 | A | 3/2022 |
| CN | 114364511 | A | 4/2022 |
| CN | 115023333 | A | 9/2022 |
| EP | 2654412 | A1 | 10/2013 |
| EP | 3001822 | A2 | 4/2016 |
| EP | 3004435 | A2 | 4/2016 |
| EP | 3022046 | A1 | 5/2016 |
| EP | 3027411 | A1 | 6/2016 |
| EP | 2930008 | B1 | 9/2016 |
| EP | 3130444 | A1 | 2/2017 |
| EP | 3004435 | A4 | 3/2017 |
| EP | 3137286 | A1 | 3/2017 |
| EP | 3022046 | A4 | 5/2017 |
| EP | 2654412 | A4 | 11/2017 |
| EP | 3238021 | A1 | 11/2017 |
| EP | 3137286 | A4 | 12/2017 |
| EP | 3263316 | A1 | 1/2018 |
| EP | 3271182 | A1 | 1/2018 |
| EP | 3284584 | A1 | 2/2018 |
| EP | 2914433 | B1 | 3/2018 |
| EP | 3284584 | A4 | 3/2018 |
| EP | 3330329 | A2 | 6/2018 |
| EP | 3004435 | B1 | 8/2018 |
| EP | 3142850 | B1 | 8/2018 |
| EP | 3330329 | A3 | 9/2018 |
| EP | 3368018 | A1 | 9/2018 |
| EP | 3383628 | A1 | 10/2018 |
| EP | 3390007 | A2 | 10/2018 |
| EP | 3271182 | A4 | 11/2018 |
| EP | 3409444 | A1 | 12/2018 |
| EP | 3414094 | A1 | 12/2018 |
| EP | 3417391 | A1 | 12/2018 |
| EP | 3053730 | B1 | 2/2019 |
| EP | 3263316 | B1 | 2/2019 |
| EP | 3444102 | A1 | 2/2019 |
| EP | 3205677 | B1 | 3/2019 |
| EP | 3459710 | A1 | 3/2019 |
| EP | 3226165 | B1 | 4/2019 |
| EP | 3219474 | B1 | 5/2019 |
| EP | 3487685 | A1 | 5/2019 |
| EP | 3122542 | B1 | 6/2019 |
| EP | 3492244 | A1 | 6/2019 |

(56) References Cited

FOREIGN PATENT DOCUMENTS

| | | | |
|---|---|---|---|
| EP | 3341186 | A4 | 7/2019 |
| EP | 3417391 | A4 | 7/2019 |
| EP | 3383628 | A4 | 8/2019 |
| EP | 3390007 | A4 | 8/2019 |
| EP | 3415300 | B1 | 8/2019 |
| EP | 3001822 | B1 | 9/2019 |
| EP | 2654412 | B1 | 10/2019 |
| EP | 3341179 | A4 | 10/2019 |
| EP | 3322843 | B1 | 11/2019 |
| EP | 3565705 | A1 | 11/2019 |
| EP | 3022046 | B1 | 12/2019 |
| EP | 3433437 | A4 | 12/2019 |
| EP | 3578280 | A1 | 12/2019 |
| EP | 3580044 | A1 | 12/2019 |
| EP | 3414094 | A4 | 1/2020 |
| EP | 3455047 | B1 | 2/2020 |
| EP | 3612390 | A1 | 2/2020 |
| EP | 3613581 | A1 | 2/2020 |
| EP | 3615302 | A1 | 3/2020 |
| EP | 3615303 | A1 | 3/2020 |
| EP | 3615309 | A1 | 3/2020 |
| EP | 3619026 | A1 | 3/2020 |
| EP | 3130444 | B1 | 4/2020 |
| EP | 3290187 | B1 | 4/2020 |
| EP | 3331704 | B1 | 4/2020 |
| EP | 3590685 | A4 | 4/2020 |
| EP | 3634728 | A1 | 4/2020 |
| EP | 3634758 | A1 | 4/2020 |
| EP | 3642012 | A1 | 4/2020 |
| EP | 3642013 | A1 | 4/2020 |
| EP | 3642014 | A1 | 4/2020 |
| EP | 3653361 | A1 | 5/2020 |
| EP | 3655236 | A1 | 5/2020 |
| EP | 3658356 | A1 | 6/2020 |
| EP | 3664990 | A1 | 6/2020 |
| EP | 3156217 | B1 | 7/2020 |
| EP | 3321066 | B1 | 7/2020 |
| EP | 3551424 | A4 | 7/2020 |
| EP | 3684594 | A1 | 7/2020 |
| EP | 3685996 | A1 | 7/2020 |
| EP | 3365157 | B1 | 8/2020 |
| EP | 3501799 | B1 | 8/2020 |
| EP | 3697592 | A1 | 8/2020 |
| EP | 3390012 | B1 | 9/2020 |
| EP | 3509818 | A4 | 9/2020 |
| EP | 3565705 | A4 | 9/2020 |
| EP | 3706984 | A1 | 9/2020 |
| EP | 3140106 | B1 | 10/2020 |
| EP | 3717203 | A1 | 10/2020 |
| EP | 3718744 | A1 | 10/2020 |
| EP | 3580044 | A4 | 11/2020 |
| EP | 3738941 | A1 | 11/2020 |
| EP | 3612390 | A4 | 12/2020 |
| EP | 3615302 | A4 | 12/2020 |
| EP | 3615309 | A4 | 12/2020 |
| EP | 3619026 | A4 | 12/2020 |
| EP | 3753553 | A1 | 12/2020 |
| EP | 2974825 | B1 | 1/2021 |
| EP | 3615303 | A4 | 1/2021 |
| EP | 3634728 | A4 | 1/2021 |
| EP | 3743255 | A4 | 1/2021 |
| EP | 3019648 | B1 | 2/2021 |
| EP | 3642012 | A4 | 2/2021 |
| EP | 3774283 | A2 | 2/2021 |
| EP | 3642014 | A4 | 3/2021 |
| EP | 3655236 | A4 | 3/2021 |
| EP | 3658356 | A4 | 3/2021 |
| EP | 3797972 | A1 | 3/2021 |
| EP | 3490783 | B1 | 4/2021 |
| EP | 3615304 | A4 | 4/2021 |
| EP | 3642013 | A4 | 4/2021 |
| EP | 3812115 | A1 | 4/2021 |
| EP | 3135460 | B1 | 5/2021 |
| EP | 3697592 | A4 | 5/2021 |
| EP | 3684594 | A4 | 6/2021 |
| EP | 3717203 | A4 | 6/2021 |
| EP | 3836904 | A1 | 6/2021 |
| EP | 3294531 | B1 | 7/2021 |
| EP | 3351594 | B1 | 9/2021 |
| EP | 3613581 | B1 | 9/2021 |
| EP | 3884344 | A2 | 9/2021 |
| EP | 3749602 | A4 | 10/2021 |
| EP | 3888879 | A1 | 10/2021 |
| EP | 3271182 | B1 | 12/2021 |
| EP | 3922437 | A1 | 12/2021 |
| EP | 3924172 | A2 | 12/2021 |
| EP | 3927522 | A1 | 12/2021 |
| EP | 3930982 | A1 | 1/2022 |
| EP | 3941665 | A1 | 1/2022 |
| EP | 3898182 | A4 | 2/2022 |
| EP | 3898191 | A4 | 2/2022 |
| EP | 3950207 | A1 | 2/2022 |
| EP | 3969427 | A1 | 3/2022 |
| EP | 3368271 | B1 | 4/2022 |
| EP | 3960917 | A3 | 4/2022 |
| EP | 3983198 | A1 | 4/2022 |
| EP | 3986692 | A1 | 4/2022 |
| EP | 4000868 | A1 | 5/2022 |
| EP | 3330329 | B1 | 6/2022 |
| EP | 4005777 | A1 | 6/2022 |
| EP | 4017707 | A1 | 6/2022 |
| EP | 4031353 | A1 | 7/2022 |
| EP | 3873722 | A4 | 8/2022 |
| EP | 4035871 | A1 | 8/2022 |
| EP | 4061612 | A2 | 9/2022 |
| EP | 3906145 | A4 | 10/2022 |
| EP | 4035871 | A4 | 10/2022 |
| EP | 4065337 | A1 | 10/2022 |
| EP | 4069495 | A1 | 10/2022 |
| EP | 3939773 | A4 | 11/2022 |
| EP | 3950207 | A4 | 11/2022 |
| EP | 4082756 | A1 | 11/2022 |
| EP | 4100198 | A1 | 12/2022 |
| EP | 4110553 | A1 | 1/2023 |
| EP | 4119330 | A1 | 1/2023 |
| EP | 3797972 | B1 | 3/2023 |
| EP | 3819099 | B1 | 3/2023 |
| EP | 4151391 | A1 | 3/2023 |
| EP | 4151392 | A1 | 3/2023 |
| EP | 4153491 | A1 | 3/2023 |
| EP | 3615309 | B1 | 4/2023 |
| EP | 4157611 | A1 | 4/2023 |
| EP | 4161722 | A1 | 4/2023 |
| EP | 4173804 | A1 | 5/2023 |
| GB | 2578713 | A | 5/2020 |
| GB | 2582181 | A | 9/2020 |
| GB | 2585638 | A | 1/2021 |
| GB | 2580194 | B | 2/2021 |
| GB | 2611314 | A | 4/2023 |
| HK | 1213848 | A1 | 7/2016 |
| HK | 1257456 | A1 | 10/2019 |
| IL | 266425 | A | 6/2019 |
| IL | 272462 | A | 3/2020 |
| IL | 276096 | A | 8/2020 |
| IL | 250098 | A | 3/2021 |
| IL | 298226 | A | 1/2023 |
| IL | 298430 | A | 1/2023 |
| IL | 298564 | A | 1/2023 |
| JP | 2017027267 | A | 2/2017 |
| JP | 2017185788 | A | 10/2017 |
| JP | 2019043119 | A | 3/2019 |
| JP | 2019210551 | A | 12/2019 |
| JP | 2022040041 | A | 3/2022 |
| JP | 7148943 | B2 | 10/2022 |
| KR | 101369617 | B1 | 3/2014 |
| KR | 20150115027 | A | 10/2015 |
| KR | 20160022532 | A | 3/2016 |
| KR | 20160092451 | A | 8/2016 |
| KR | 20160112503 | A | 9/2016 |
| KR | 101662894 | B1 | 10/2016 |
| KR | 20160114348 | A | 10/2016 |
| KR | 20160114349 | A | 10/2016 |
| KR | 20160114350 | A | 10/2016 |
| KR | 20160114351 | A | 10/2016 |

(56) References Cited

FOREIGN PATENT DOCUMENTS

| | | | |
|---|---|---|---|
| KR | 20160114352 | A | 10/2016 |
| KR | 20160114354 | A | 10/2016 |
| KR | 20160114355 | A | 10/2016 |
| KR | 101682601 | B1 | 1/2017 |
| KR | 101723725 | B1 | 4/2017 |
| KR | 101723726 | B1 | 4/2017 |
| KR | 101723727 | B1 | 4/2017 |
| KR | 101730703 | B1 | 4/2017 |
| KR | 101730704 | B1 | 4/2017 |
| KR | 101730705 | B1 | 4/2017 |
| KR | 101730706 | B1 | 4/2017 |
| KR | 20170054164 | A | 5/2017 |
| KR | 101757989 | B1 | 7/2017 |
| KR | 200486107 | Y1 | 4/2018 |
| KR | 20180075341 | A | 7/2018 |
| KR | 20180078474 | A | 7/2018 |
| KR | 101899048 | B1 | 9/2018 |
| KR | 101968967 | B1 | 8/2019 |
| KR | 20190140136 | A | 12/2019 |
| KR | 102138946 | B1 | 7/2020 |
| KR | 102237867 | B1 | 4/2021 |
| KR | 102254748 | B1 | 5/2021 |
| KR | 20210070697 | A | 6/2021 |
| KR | 102294723 | B1 | 8/2021 |
| KR | 20220027768 | A | 3/2022 |
| KR | 20220041991 | A | 4/2022 |
| KR | 102411509 | B1 | 6/2022 |
| KR | 20220085754 | A | 6/2022 |
| KR | 102442915 | B1 | 9/2022 |
| KR | 102521622 | B1 | 4/2023 |
| KR | 102527966 | B1 | 5/2023 |
| KR | 20230060635 | A | 5/2023 |
| NL | 2015361 | B1 | 3/2017 |
| RU | 2770997 | C1 | 4/2022 |
| SE | 1750700 | A1 | 12/2018 |
| SE | 540986 | C2 | 2/2019 |
| TW | 201532793 | A | 9/2015 |
| TW | 201603937 | A | 2/2016 |
| TW | 202231385 | A | 8/2022 |
| WO | 2012085914 | A1 | 6/2012 |
| WO | 2014197732 | A2 | 12/2014 |
| WO | 2014197732 | A3 | 1/2015 |
| WO | 2015009938 | A1 | 1/2015 |
| WO | 2015012992 | A2 | 1/2015 |
| WO | 2015016999 | A1 | 2/2015 |
| WO | 2015012992 | A3 | 4/2015 |
| WO | 2015057886 | A1 | 4/2015 |
| WO | 2015149054 | A1 | 10/2015 |
| WO | 2015167896 | A1 | 11/2015 |
| WO | 2016011252 | A1 | 1/2016 |
| WO | 2016040453 | A1 | 3/2016 |
| WO | 2016094329 | A1 | 6/2016 |
| WO | 2016105220 | A1 | 6/2016 |
| WO | 2016133853 | A1 | 8/2016 |
| WO | 2016182790 | A1 | 11/2016 |
| WO | 2017023281 | A1 | 2/2017 |
| WO | 2017034513 | A1 | 3/2017 |
| WO | 2017035228 | A1 | 3/2017 |
| WO | 2017035313 | A1 | 3/2017 |
| WO | 2017062567 | A1 | 4/2017 |
| WO | 2017072536 | A1 | 5/2017 |
| WO | 2017075575 | A1 | 5/2017 |
| WO | 2017139766 | A1 | 8/2017 |
| WO | 2017143063 | A1 | 8/2017 |
| WO | 2017139766 | A4 | 10/2017 |
| WO | 2017172574 | A1 | 10/2017 |
| WO | 2017184002 | A1 | 10/2017 |
| WO | 2017189018 | A2 | 11/2017 |
| WO | 2017189019 | A1 | 11/2017 |
| WO | 2017195159 | A1 | 11/2017 |
| WO | 2017196339 | A1 | 11/2017 |
| WO | 2017196345 | A1 | 11/2017 |
| WO | 2018005439 | A1 | 1/2018 |
| WO | 2018015092 | A1 | 1/2018 |
| WO | 2018015192 | A1 | 1/2018 |
| WO | 2018017116 | A1 | 1/2018 |
| WO | 2017189018 | A3 | 2/2018 |
| WO | 2018019747 | A1 | 2/2018 |
| WO | 2018020237 | A1 | 2/2018 |
| WO | 2018048898 | A1 | 3/2018 |
| WO | 2018072954 | A1 | 4/2018 |
| WO | 2018075741 | A1 | 4/2018 |
| WO | 2018093390 | A1 | 5/2018 |
| WO | 2018115467 | A1 | 6/2018 |
| WO | 2018128695 | A2 | 7/2018 |
| WO | 2018136902 | A1 | 7/2018 |
| WO | 2018128695 | A3 | 8/2018 |
| WO | 2018151720 | A1 | 8/2018 |
| WO | 2018160287 | A1 | 9/2018 |
| WO | 2018182536 | A1 | 10/2018 |
| WO | 2018183396 | A1 | 10/2018 |
| WO | 2018190855 | A1 | 10/2018 |
| WO | 2018191419 | A1 | 10/2018 |
| WO | 2018191667 | A1 | 10/2018 |
| WO | 2018191689 | A1 | 10/2018 |
| WO | 2018194539 | A1 | 10/2018 |
| WO | 2018194540 | A1 | 10/2018 |
| WO | 2018194647 | A1 | 10/2018 |
| WO | 2018194652 | A1 | 10/2018 |
| WO | 2018223761 | A1 | 12/2018 |
| WO | 2018224395 | A1 | 12/2018 |
| WO | 2018227229 | A1 | 12/2018 |
| WO | 2019017956 | A1 | 1/2019 |
| WO | 2019022740 | A1 | 1/2019 |
| WO | 2019022751 | A1 | 1/2019 |
| WO | 2019022754 | A1 | 1/2019 |
| WO | 2019022755 | A1 | 1/2019 |
| WO | 2019022757 | A1 | 1/2019 |
| WO | 2019022759 | A1 | 1/2019 |
| WO | 2019022760 | A1 | 1/2019 |
| WO | 2019022761 | A1 | 1/2019 |
| WO | 2019022762 | A1 | 1/2019 |
| WO | 2019023789 | A1 | 2/2019 |
| WO | 2019027405 | A1 | 2/2019 |
| WO | 2019027429 | A1 | 2/2019 |
| WO | 2019030109 | A1 | 2/2019 |
| WO | WO-2019034186 | A1 * | 2/2019 ........... B29C 64/364 |
| WO | 2019070266 | A1 | 4/2019 |
| WO | 2019070267 | A1 | 4/2019 |
| WO | 2019070270 | A1 | 4/2019 |
| WO | 2019070281 | A1 | 4/2019 |
| WO | 2019078813 | A1 | 4/2019 |
| WO | 2019108199 | A1 | 6/2019 |
| WO | 2019112403 | A1 | 6/2019 |
| WO | 2019125464 | A1 | 6/2019 |
| WO | 2019145594 | A1 | 8/2019 |
| WO | 2019155460 | A1 | 8/2019 |
| WO | 2019172899 | A1 | 9/2019 |
| WO | 2019173000 | A1 | 9/2019 |
| WO | 2019209237 | A1 | 10/2019 |
| WO | 2019209341 | A1 | 10/2019 |
| WO | 2019193369 | A3 | 12/2019 |
| WO | 2019241690 | A1 | 12/2019 |
| WO | 2020035680 | A1 | 2/2020 |
| WO | 2020093028 | A1 | 5/2020 |
| WO | 2020104775 | A2 | 5/2020 |
| WO | 2020104775 | A3 | 7/2020 |
| WO | 2020159474 | A1 | 8/2020 |
| WO | 2020169423 | A1 | 8/2020 |
| WO | 2020174081 | A1 | 9/2020 |
| WO | 2020187895 | A1 | 9/2020 |
| WO | 2020188253 | A1 | 9/2020 |
| WO | 2020165423 | A3 | 10/2020 |
| WO | 2020198881 | A1 | 10/2020 |
| WO | 2020222751 | A1 | 11/2020 |
| WO | 2020228998 | A1 | 11/2020 |
| WO | 2020229251 | A1 | 11/2020 |
| WO | 2020249189 | A1 | 12/2020 |
| WO | 2020255069 | A1 | 12/2020 |
| WO | 2020256696 | A1 | 12/2020 |
| WO | 2020256699 | A1 | 12/2020 |
| WO | 2020256701 | A1 | 12/2020 |
| WO | 2021004055 | A1 | 1/2021 |
| WO | 2021032093 | A1 | 2/2021 |

(56) References Cited

FOREIGN PATENT DOCUMENTS

| | | | |
|---|---|---|---|
| WO | 2021032154 | A1 | 2/2021 |
| WO | 2021041422 | A1 | 3/2021 |
| WO | 2021055494 | A1 | 3/2021 |
| WO | 2021067576 | A1 | 4/2021 |
| WO | 2021086922 | A1 | 5/2021 |
| WO | 2019236206 | A3 | 6/2021 |
| WO | 2021108402 | A1 | 6/2021 |
| WO | 2021112692 | A1 | 6/2021 |
| WO | 2021100023 | A3 | 8/2021 |
| WO | 2021154224 | A1 | 8/2021 |
| WO | 2021154248 | A1 | 8/2021 |
| WO | 2021154262 | A1 | 8/2021 |
| WO | 2021158529 | A1 | 8/2021 |
| WO | 2021165879 | A1 | 8/2021 |
| WO | 2021171141 | A1 | 9/2021 |
| WO | 2021173618 | A2 | 9/2021 |
| WO | 2021173618 | A3 | 10/2021 |
| WO | 2021198100 | A1 | 10/2021 |
| WO | 2021236585 | A1 | 11/2021 |
| WO | 2021242871 | A1 | 12/2021 |
| WO | 2021247640 | A1 | 12/2021 |
| WO | 2022011164 | A1 | 1/2022 |
| WO | 2022022828 | A1 | 2/2022 |
| WO | 2022093019 | A1 | 5/2022 |
| WO | 2022093601 | A1 | 5/2022 |
| WO | 2022104122 | A1 | 5/2022 |
| WO | 2022124488 | A1 | 6/2022 |
| WO | 2022133330 | A1 | 6/2022 |
| WO | 2021236585 | A9 | 7/2022 |
| WO | 2022146864 | A1 | 7/2022 |
| WO | 2021236585 | A8 | 8/2022 |
| WO | 2022167799 | A1 | 8/2022 |
| WO | 2022173623 | A1 | 8/2022 |
| WO | 2022177952 | A1 | 8/2022 |
| WO | 2022229385 | A1 | 11/2022 |
| WO | 2022232888 | A1 | 11/2022 |
| WO | 2022240906 | A1 | 11/2022 |
| WO | 2022220914 | A3 | 12/2022 |
| WO | 2023003590 | A1 | 1/2023 |
| WO | 2023275262 | A1 | 1/2023 |
| WO | 2023287706 | A1 | 1/2023 |
| WO | 2023006989 | A1 | 2/2023 |
| WO | 2023008993 | A1 | 2/2023 |
| WO | 2023012088 | A1 | 2/2023 |
| WO | 2023022703 | A1 | 2/2023 |
| WO | 2023031099 | A1 | 3/2023 |

* cited by examiner

3D PRINTER WITH THE ABILITY TO PRINT COMPOSITE PLASTICS AND PLASTIC METAL AND PLASTIC CERAMICS COMPOUNDS THROUGH ADDITIVE MANUFACTURING

CROSS-REFERENCE TO RELATED APPLICATIONS

This application claims priority to U.S. Provisional Patent Application No. 63/597,545, filed Nov. 9, 2023, and U.S. Provisional Patent Application No. 63/601,510, filed Nov. 21, 2023. The entirety of each of these applications is incorporated by reference herein.

FIELD OF INVENTION

The present disclosure relates to the field of additive manufacturing of a wide range of thermoplastic, plastic-ceramic, metal and blended metal-plastic structures, polymers, composites, and/or other materials. In particular, the present disclosure relates to a large-scale, versatile, cost-effective 3D printer, and its constituent components, including custom-build firmware and software, configured to achieve high quality prints and allowing the use of a wide range of additive manufacturing input file formats.

This may include, but is not limited to, heated print beds, 3D printers comprising such heated print beds, methods of manufacturing such heated print beds, and/or 3D printers including a heated enclosure encompassing a printing environment capable of maintaining high temperatures.

BACKGROUND 3D printing, often referred to as additive manufacturing, plays a pivotal role in the industry 4.0 revolution, which represents the integration of advanced digital technologies into manufacturing processes. The origins of 3D printing date back to the 1980s with the invention of layered creation of 3D objects by using a technique known as photopolymerization. As the interest in this technology increased, various 3D printing techniques such as selective laser sintering (SLS) and fused deposition modeling (FDM) were developed, diversifying the capabilities of this revolutionary technology.

In the present-day world, 3D printing is being utilized in a diverse array of applications ranging from food preparation to bioprinting and healthcare. This adaptation of the 3D printing technology into multiple fields leads to usage of new/novel materials (depending on the application) as well as production characteristics in accordance with national/international standards. The choice and physical form of raw material (print feed) to be utilized in a 3D printer relies heavily on the final application of the finished product, which in turn decides the custom nature of the 3D printer.

With the recent penetration of the 3D printing technology in aerospace, automotive, healthcare and consumer electronics sectors, the search for suitable (strong yet lightweight) print feed has led to the usage of various metal-plastic composites. Such blended composites allow for the customization of materials with specific properties, making it valuable for the industries requiring performance and efficiency of their products. The physical size of the final printed component determines the dimensions of the different components of the 3D printer. Although off-the-shelf 3D printers are available for hobbyists, industrial applications require thorough re-design of individual 3D printer blocks to ensure quality of the final product being produced.

3D printers, particularly those utilizing the fused deposition modeling (FDM) or fused filament fabrication (FFF) technology, are well documented in the prior art. The printing procedure for such devices entails heating a print feed material, pushing it out of a heated nozzle, and incrementally assembling, layer upon layer, until the result in the form of a 3D object is created on a temperature-maintained print bed. Since the printing process involves sequential placement of layers, the success and quality of the print job relies on the ability to maintain alignment between the object and the extruder nozzle such that the entire model aligns itself into the proper 3D model.

The final result of the 3D printer relies greatly on the proper adhesion between the printed object and the printing surface, commonly referred to as the print bed. The print beds in conventional FDM-based 3D printers are constructed mainly from materials like metals, glass, and acrylic. Improper adhesion of the initial layer may lead to crooked designs resulting in subpar quality prints. Conventional 3D printers involve using heat resistant polyimide films to fix the base layers on the print bed while the printing process proceeds, this is done to ensure the printing is done in an aligned manner. Some applications require the print feed material to be cooled gradually (acrylonitrile butadiene styrene, ABS), such situations demand the usage of heated print beds having the ability to maintain a certain desired elevated temperature on the print bed surface as well as the ability to gradually and controllably cool down.

Among the most widely employed industrial-grade 3D printers, fused deposition modeling (FDM) or fused filament fabrication (FFF) technology is often used as the preferred method of filament deposition. Fused granule fabrication (FGF) is a newer technology, also known as fused particle fabrication or pellet 3D printing, based on the extrusion 3D printing technique which uses solid (usually plastic) pellets for feedstock instead of filaments. FGF involves heating solid granules/pellets made of special materials and extruding the melted mass onto a print surface. Subsequent layering of the melted filament results in a final product as desired by the user. The melting process happens in a controlled manner where the temperature as well as the extrusion amount of the 3D printer is adjusted through a computer-assisted program to ensure the quality and design requirements of the user are met. Among the multitude of extruders reported in the prior art, screw-based extrusion setups are widely used owing to their ability to handle different material types, offer consistent material flow, and provide higher output rates.

For a given print feed using pellet feedstock, the quality (as well as the finishing) of the final product depends greatly on the ambience of the conditions in which the printing takes place. Specifically, usage of high-temperature materials in extrusion-based 3D printers desirably requires a certain specified temperature to be maintained while the printing process takes place. This prevents the printed layers from cooling quickly, promoting adhesion of the individual layers while reducing brittleness of the final design. An insulated enclosure, generally known as the heated build chamber, is usually created around the workbench to maintain desired temperature during the printing process. Depending on the size of the final print, variations of the heated build chamber provide insulation and help aid the product finishing and curing process.

Some of the most commonly observed disadvantages in the prior art include the inconsistent adhesion of the polyimide films/masking tapes when employed in heated print bed designs, difficulty in installing/removing the films, and adhesion issues when using different print feeds being extruded at different temperatures. The films usually do not tolerate high surface temperature leading to destruction of the film itself, and subsequent damage to the print bed surface. Moreover, inconsistent heating/melting of the granules/pellets during the extrusion process, and inability of the extruder to maintain a certain temperature are further drawbacks of the reported designs.

In view of the aforementioned shortcomings in the existing 3D printer print beds, there remains a growing need to improve the flexibility, usage and effectiveness of the print bed for high quality 3D output for different applications. Moreover, in view of the need to maintain specific high temperatures, especially for plastic-metal composite print feeds, there is a need to develop a heated build chamber capable of maintaining reasonable temperature levels for pre-defined time periods. The heated build chamber should also help shield the sensitive components of the 3D printer from excessive heat produced during the printing process without compromising the 3D printing operations. Additionally, in order to accommodate a diverse range of print feed material, and to ensure smooth printing, the extruder designs need to be able to handle the varying temperature conditions and print speeds as required by applications.

SUMMARY OF THE PRESENT DISCLOSURE

A brief summary of one or more embodiments of the present disclosure is given below to provide a basic understanding for such embodiments. This summary is not an exhaustive review of all the conceived embodiments and is intended to neither point out all the critical or decisive factors of all the embodiments nor define/limit the scope of any or all of the embodiments.

Custom-built large-scale, versatile 3D printing setups using blended composites may address some or all of the issues noted above. Such 3D printing setups may require highly specific component design in line with the finished product requirements. Thus, various embodiments of the present disclosure include a purpose-built large-scale, versatile, cost-effective 3D printer-based additive manufacturing system with the capabilities to print industrial scale articles using a multitude of blended raw materials which may include plastics, ceramics, and polymers as well as metal and metal-plastic composites, for example. The proposed additive manufacturing system may combine the features of fused filament fabrication and fused granular fabrication, while overcoming the drawbacks associated with each technology deployed individually, allowing pallet printing (continuous printing without the need to change filament spools), and thus expanding the scope, size, quality, and speed of polymer-based additive manufacturing while reducing costs. According to at least some of the various embodiments disclosed herein, six specific blocks, namely, the heated bed, heated build chamber, pellet feeder system, extruder, kinematics, and electronics, may be included within the disclosed 3D printer.

According to at least one of the disclosed embodiments, an intricate pellet feeder system forms the backbone of holding and dispensing (on demand) the feedstock for printing purposes. The pellet feeder system may comprise column shaped hoppers as to hold the pellets, a pneumatic drying mechanism to dry the pellets before dispatching for printing, and a blower-based system for filling the hoppers with dried pellets when the sensors detect critically low level of the reservoir. In accordance with at least one embodiment, multiple sensors may be installed within the pellet feeder setup to detect and report the presence of pellets within the system and to ensure proper fill-up of pellets for uninterrupted operation of the 3D printer. According to at least one embodiment, a pneumatic blowing mechanism within the column shaped hopper may be included to ensure proper emptying of the hoppers, and to prevent any unused print feed from collecting unintentionally and causing blockage within feeding mechanism. Periodic operation of the said pneumatic blowing mechanism may ensure proper emptying of the column shaped hoppers to ensure the smooth flow of pellets within the extrusion system.

At least one embodiment of the disclosure includes multiple extruders which melt the pellets to create the physical objects being printed. According to at least one embodiment, the extruder may comprise a secondary pellet hopper which contains the pellets before melting them. Every extruder may have at least one screw. The screw or the plurality of screws within an extruder can transport the individual granules/pellets from the secondary pellet hopper to the plasticization zone where the pellets can be melted and dosed out through a nozzle designed from a metal alloy. A cooling setup may be attached inside the extruder which prevents the extruder from overheating the screw. Multiple sensors within the extruder body may enable monitoring of temperature, detect the presence of pellets, and/or report the operational state of the extrusion process.

Multiple embodiments of the current disclosure present designs of a heated vacuum table to be employed as a print bed in 3D printers. At least one embodiment includes a specially designed aluminum surface employed as a thermal/heated vacuum table acting as the print bed with multiple heating elements embedded inside the aluminum surface to maintain a desired temperature at the print bed surface. In order to maintain a desired degree of adhesion for the final product, the heating print bed can be mounted on the frame, and the vacuum distributors can be connected to it from below. Convectors with heaters can be installed to the left and right of the print table to mix and maintain the air in the working chamber at the set temperature. In at least one embodiment, the print bed can be installed within a convector assembly equipped with vacuum creation mechanism underneath. This convector setup may be installed directly on the 3D printer frame, concealed with corresponding convector panels, with the vacuum lines running beneath the structure. According to at least one embodiment, the installation can be configured such that the heat from the convectors provides a uniform temperature increase within the heated build chamber. In at least one embodiment, systematically etched surface vacuum channels, connected to a plurality of vacuum tanks installed in the bottom, may also be made available on the top surface of the heated vacuum table to ensure a desirable level of suction on the print bed. According to at least one embodiment, the print bed can be covered with a disposable sheet of semiconducting material with good adhesion properties in relation the printed object, held in place by the vacuum mechanism. A plurality of stainless-steel supports can be attached at the bottom of the print bed to enable resting as well as fixing the print bed on to the 3D printer frame.

At least one embodiment of this disclosure includes a durable, impact deformation resistant, ergonomic and easily customizable kinematics unit/portal capable of moving an extruder head (e.g., which may be up to 60 kg) at the maximum speed of 2 m/s. The setup may include a frame for the kinematics platform can include a cubic metal frame with built-in conduits for cables, mounting points for pulleys, and multiple rails and carriages. A kinematics structure supporting movement of the portal in the horizontal (XY-plane) can include a lightweight rectangular metallic portal housing multiple linear motors and servomotors along with ball screws and a gantry to mount the extruders. Movement in the vertical (Z-plane) can be realized through another set of motors capable of moving the entire portal along the Z-axis as required by the print job. The extruder can be connected to this metallic portal with the movement supported by the kinematics setup.

At least one embodiment of this disclosure includes a dynamic enclosed heated build chamber configured to maintain a desired printing ambiance while the printing process takes place. According to at least one embodiment, the said heated build chamber may be constructed between a kinematics portal on top, and a heated print bed at the bottom, having a thermal shield on the sides. The chamber can maintain a constant temperature throughout the printing process to ensure proper adhesion of the multiple print layers, and a greater structural strength of the finished product or, if a variable temperature is required during the printing process for a particular material and shape, this can be achieved also via the use of one or a plurality of coolers. A lightweight corrugated protection sheet made from rubberized or covered with fluoroplastic glass fabric (for the XY-plane) and aluminized glass fabric (for the Z-plane) may help provide thermal insulation for other assemblies while enabling movement as required by kinematics. The corrugated shield can be installed such that the top of the shield is connected to the kinematics portal, with the lower part extending underneath the heated print bed.

According to at least one embodiment of the present disclosure, the thermal shield can be created from a 4-sided corrugated surface including the three vertical sides running down from the kinematics portal down towards the heated vacuum table, and the fourth horizontal side on the bottom end of the lightweight extrusion portal forming the roof of the heated build chamber. The corrugated nature of the vertical thermal shields can enable the expansion/contraction of the shield causing the heated build chamber to expand/contract vertically as the kinematics portal moves up/down, respectively, along the Z-axis. The vertical corrugated thermal shield may be constructed from an aluminized glass fabric, whereas the top side may be made from rubberized or covered with fluoroplastic glass fabric.

At least one embodiment of this disclosure can include one or more electronic circuitries to control and operate the 3D printing mechanism. For example, multiple satellite boards may be configured to control the pneumatic operations, electrical connectivity, and sensor information of the entire 3D printer. These satellite boards can connect to a central board which controls the engines and exchanges data with the satellite boards for optimum printer operation. Inter-board communication can take place over the CAN interface with the central board executing all algorithms and making decisions to direct operations of the satellites.

According to some embodiments of the present disclosure, a thermal insulated housing can be installed underneath the print bed. The thermal insulated housing may contain multiple vacuum receiver points to be connected to the vacuum tanks of the print bed, as well as mounted points to fix the vacuum table by bolting them firmly to the stainless-steel supports installed under the print bed. Additionally, specially formulated kaolin wool-based pillows can be inserted in the space between the print bed and the thermal insulated housing to ensure high degree of heat retention maintaining desired temperature inside the heated build chamber.

According to some embodiments of the present disclosure, a plurality of convectors and tangential fans may be installed on either side of the heated vacuum table, corresponding to the base of the heated build chamber. The tubular convectors can heat the air underneath the heated vacuum table, which can be circulated within the heated build chamber by the installed tangential fans to maintain internal temperatures of up to 150° C. Active control of convector-fan setup may help ensure a certain desired temperature as required by the printing process.

While multiple embodiments have been disclosed, still other embodiments of the present disclosure will become apparent to those skilled in the art from the following detailed description, which shows and describes illustrative embodiments of the described systems and methods. As will be realized, the various embodiments of the present disclosure are capable of modifications in various obvious aspects, all without departing from the spirit and scope of the present disclosure.

BRIEF DESCRIPTION OF THE DRAWINGS

A more complete appreciation of the disclosed embodiments and many of the attendant advantages thereof will become readily apparent with reference to the following detailed description, particularly when considered in conjunction with the accompanying drawings, in which.

DETAILED DESCRIPTION

Embodiments of the present disclosure will now be described more fully hereinafter with reference to the accompanying drawings, in which some, but not all embodiments of the disclosure are shown. The present disclosure will be better understood with reference to the definitions, examples and descriptions provided herein.

Figure 1:
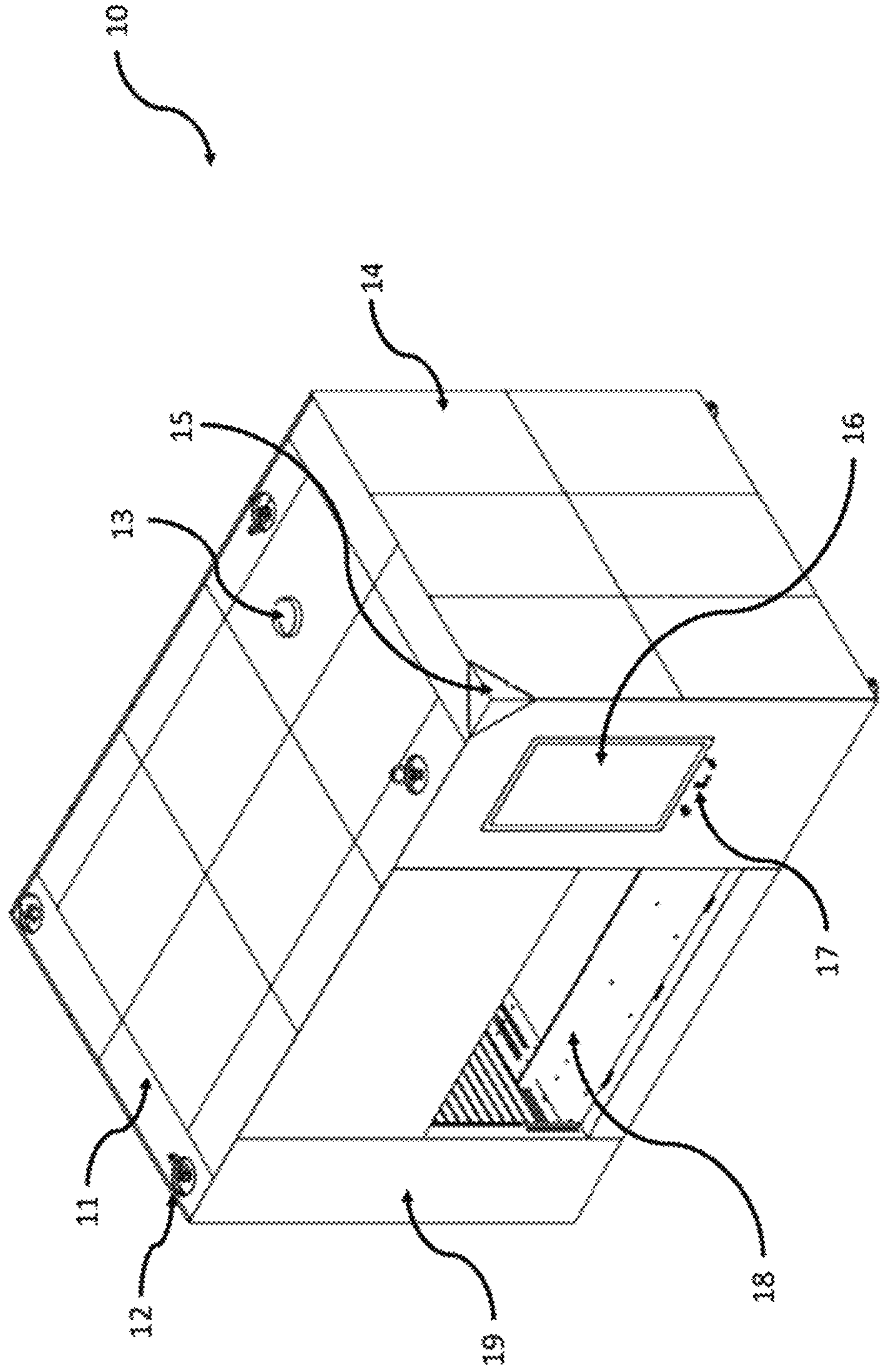
FIG. 1 shows the perspective view of a 3D printer according to an embodiment of the disclosure.

FIG. 1 shows a perspective view of a 3D printer 10 according to an embodiment of the disclosure. 3D printer 10 may include one or more removable protective panels 11, 13, 14, and 19 forming all, or a removable part, of an outer shell of the 3D printer 10. Panels 11, 13, 14, and 19 may conceal the inner workings of the 3D printer 10. One protective panel can be a roof panel 13 in some embodiments. Roof panel 13 may be provided with a ventilation outlet to vent off any fumes generated during a 3D printing deposition process. 3D printer 10 may include one or more tether points 12. For example, in some embodiments, four identical tether points 12 may be located on the frame of the 3D printer 10. Tether points 12 can be used to lift the 3D printer 10 during placement or to move the 3D printer 10, for example. An LED lamp 15 or other indicator may be located on the outer edge of the 3D printer 10 frame and may provide a visual indication of the operational state of the 3D printer 10. The working as well as progress monitoring of the printing process can be controlled via a control panel 17 and a control screen 16 installed on the 3D printer 10. For example, in the illustrated embodiment, control panel 17 and control screen 16 are disposed on the front right panel of the 3D printer 10. Access to the print bed (and the finished printed object) may be provided through a sufficiently large opening 18 provided in the 3D printer 10. For example, in the illustrated embodiment, opening 18 is located on the front of the 3D printer 10.

Figure 2:
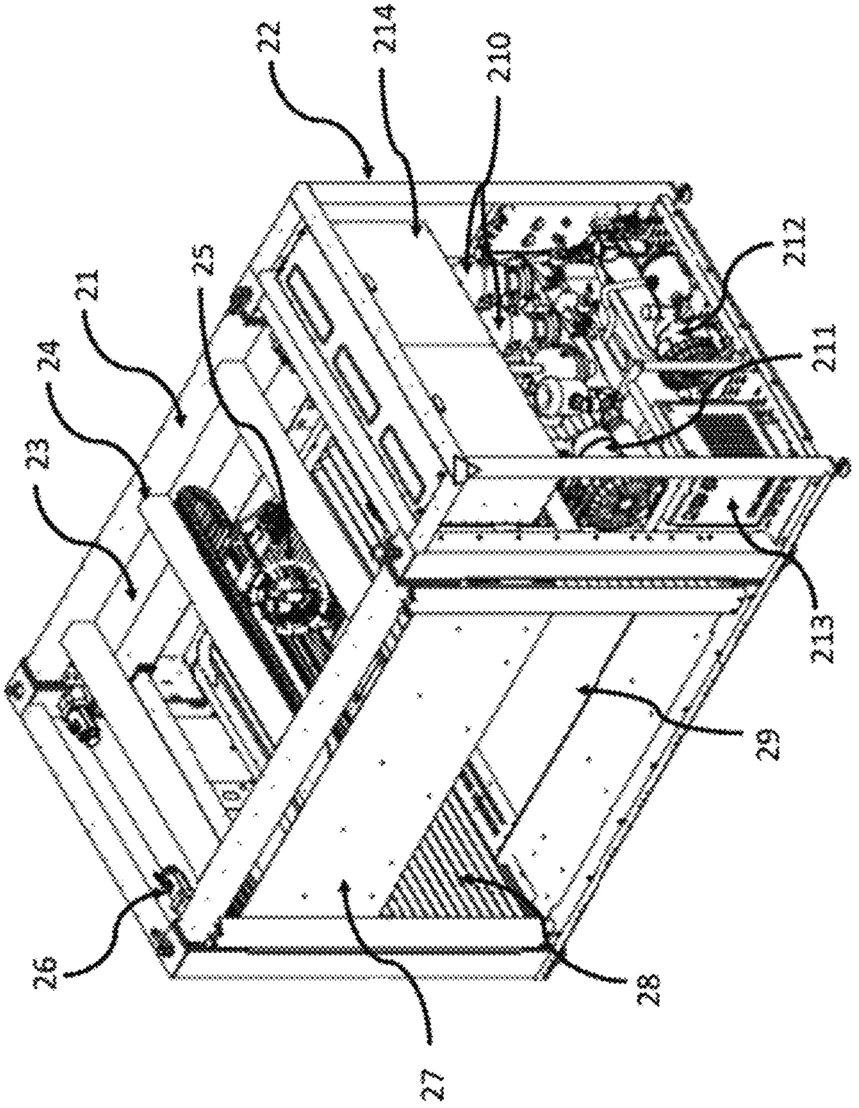
FIG. 2 shows the perspective view of a 3D printer, without protective panels, with internal components exposed, according to an embodiment of the disclosure.

Removing the protective panels 11, 13, 14 and 19 (FIG. 1) reveals the internal component placement of the 3D printer 10 as depicted in the example embodiment of FIG. 2. The 3D printer 10 may include a main frame 21 with an additional frame mount component 22 firmly attached to the main frame 21. A lightweight metallic portal 23 may be fixed onto the main frame 21 and may house a gantry assembly 24. An extruder assembly 25 may include a plurality of extruders fixed onto the gantry with multiple servo motors enabling the extruder assembly 25 to be moved in the XY-plane as required by a print job. Additional servomotors 26 may be installed on the 3D printer 10 main frame 21. For example, in the illustrated embodiment, at least four servomotors 26 can be located on each of the top four corners of the main frame 21 These servomotors 26 can enable the vertical (Z-plane) movement of the extruder assembly 25 by physically moving the lightweight metallic portal 23 vertically along the 3D printer 10 main frame 21, as the height of the printed object increases during a print job. A heated build chamber 27 may form part or all of the main printing enclosure of the 3D printer 10. The heated build chamber 27 may be formed by enclosing the spacing between the lightweight metallic portal 23 and the bottom of the 3D printer 10 frame 21 with corrugated rubberized plastic insulation sheets 28. The corrugated rubberized insulation sheets 28 may enable the expansion as well as contraction of the heated build chamber 27 as the lightweight metallic portal 23 rises or lowers respectively, as governed by the requirements of the print job. A heated print bed 29 may be placed within the heated build chamber 27 and may form all or part of the main workbench for printing jobs being undertaken by the 3D printer 10.

3D printer 10 can include an additional frame mount 22 that houses auxiliary equipment that may provide and/or perform at least some functions of the 3D printer 10. Multiple pellet feeder contraptions 210 can function not only as reservoirs/hoppers for holding print feed in the form of pellets, but also can perform the job of drying the pellets through the air provided by the pellet air blower 211, before vacuum feeding to the extruder assembly 25. An air pump blower 212 can help in feeding the dried pellets from the pellet feeder 210 to the extruder assembly 25 by pneumatically forcing dried pellets into the extruder reservoirs. A chiller unit 213 can help in regulating the temperature within the heated build chamber 27 in accordance with the print job requirements. One or more cabinets 214 may contain electronic circuitry (e.g., control boards) configured to perform and/or supervise the operations of the 3D printer 10.

Figure 3A:
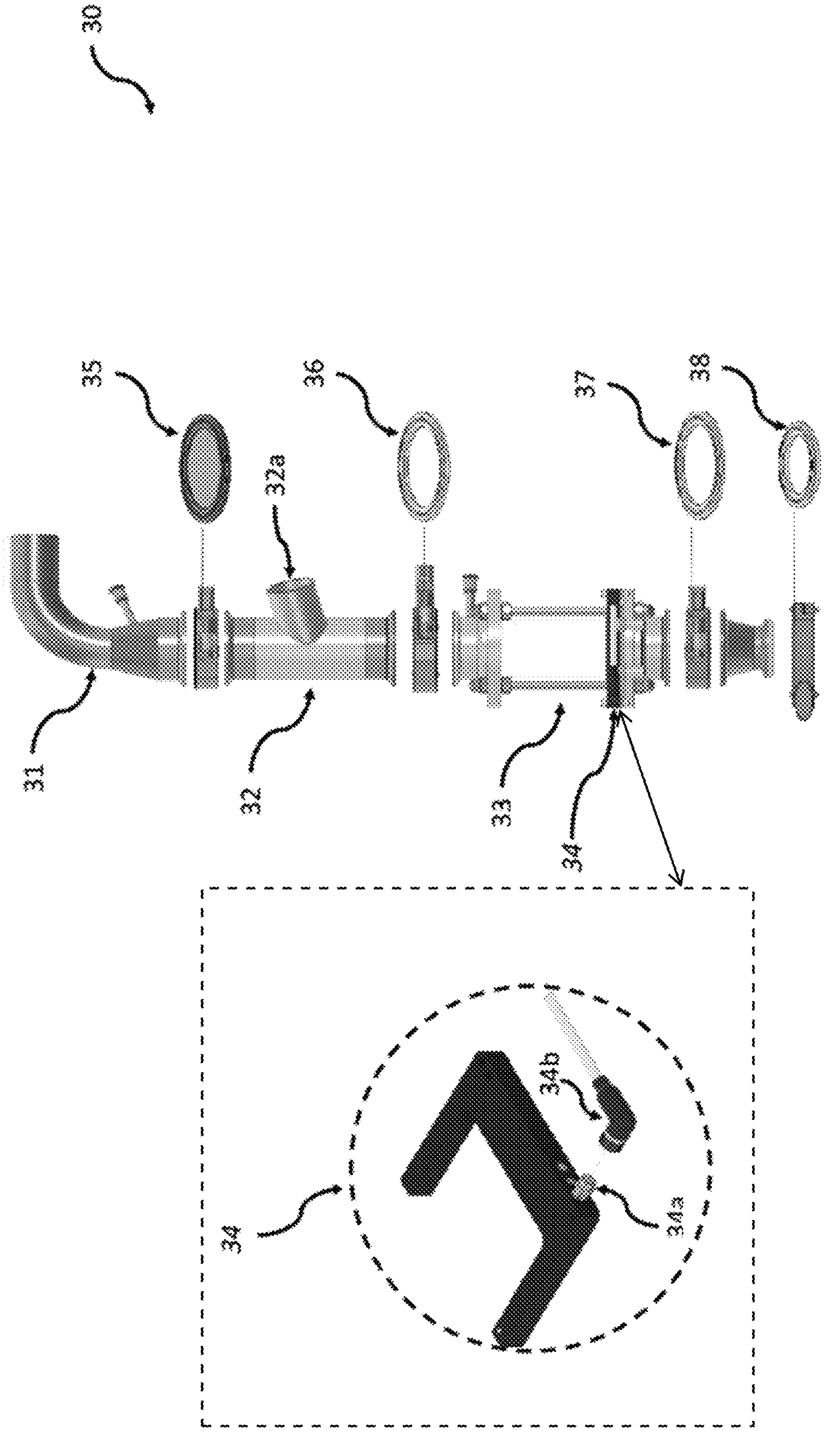
FIGS. 3A and 3B illustrate exploded views of multiple components of a pellet feeder system according to an embodiment of the disclosure.

FIG. 3*a* shows an example pellet feeder column 30 according to an embodiment of the disclosure. The pellet feeder column 30 may include a top flange 31 which connects to the dried pellet reservoir and functions as an inlet to feed and temporarily store the dried pellets before extrusion. A T-section 32 in the middle may store the freshly fed dried pellets while maintaining a tight vacuum inside the column through vacuum inlet 32*a* connected to a vacuum pump. A transparent secondary pellet storage tank 33 may store the freshly fed pellets before sending them to the extruder. A plurality of gaskets and seals 35, 36, 37, and 38 may ensure the presence of a tight vacuum inside the column chamber which acts to protect the dried pellets from environmental degradation, as well as provide an efficient operation and dispensing mechanism for the dried pellets. A U-shaped flange 34 may be disposed at the bottom of the secondary pellet storage tank 33. An optical sensor 34*a* may be connected to the main electronics board via cable 34*b* and installed in the U-shaped flange 34 to detect the presence and flow of the pellets from the secondary pellet storage tank during the extrusion process. Sensor 34*a* may detect blockages occurring during the printing, and/or the need to replenish the pellet feed. Sensor 34*a* can report detected blockages and/or the need for replenishment to the main control board, which may trigger follow up action.

Figure 3B:
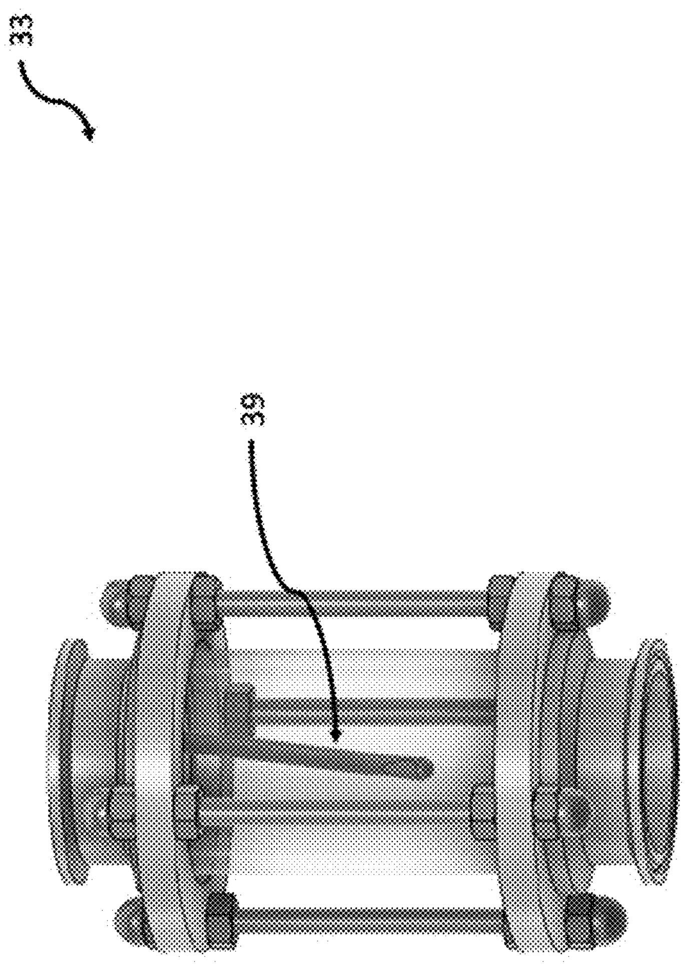

A modified version of the transparent secondary pellet storage tank 33, according to an embodiment of this disclosure, is shown in FIG. 3*b*. A metallic tube 39 connected to a pneumatic pump may be installed within the transparent secondary pellet storage tank 33. Static charge buildup during the printing process may cause the print feed pellets to stick to the walls of the transparent secondary pellet storage tank 33 thereby resulting in false readings recorded by the pellet sensor 34*a*. By periodically blowing pressurized air through the metallic tube 39, any leftover print feed pellets may be blown into the printing process enabling the sensor 34*a* to report the actual status of the pellets.

Figure 4:
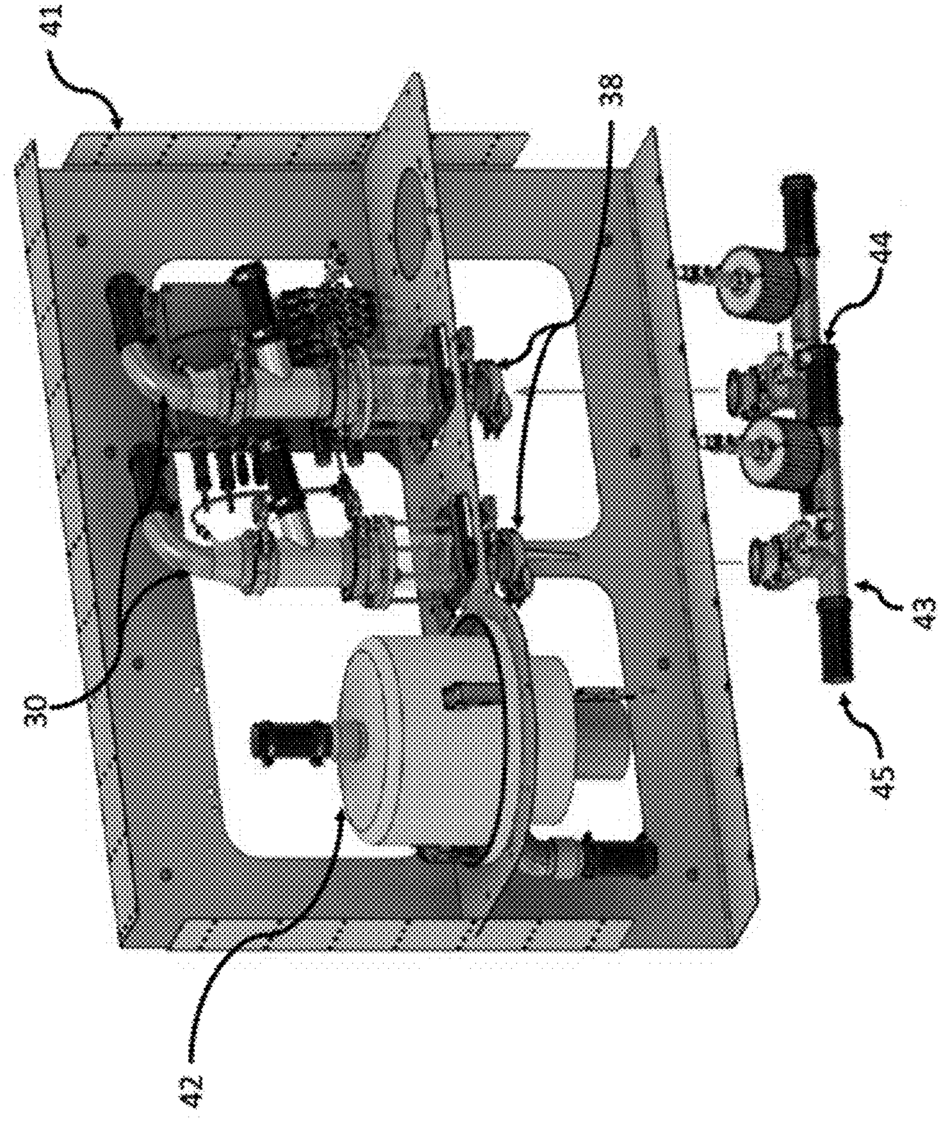
FIG. 4 shows the perspective view of a pellet feeder column of FIG. 3A installed on a 3D printer subframe according to an embodiment of the disclosure.

FIG. 4 shows a perspective view of two pellet feeder columns 30 (e.g., as shown in FIG. 3*a*) installed on a dedicated subframe 41 mounted securely in the additional frame mount component 22 (e.g., as shown in FIG. 2). A vortex blower 42 may be installed in subframe 41 and may enable the filling of the pellet feeder columns 30 when required. A pneumatic dispensing system 43 may be installed in subframe 41 (e.g., at the bottom as shown) and may connect to the outlet 38 of the pellet feeder columns 30. The pellets from the pellet feeder columns 30 can drop into the pneumatic dispensing system 43 which, under the force of compressed air being fed though one end 44, can be transported to the extruder assembly through the other end 45 of the pneumatic dispensing system 43.

Figure 5:
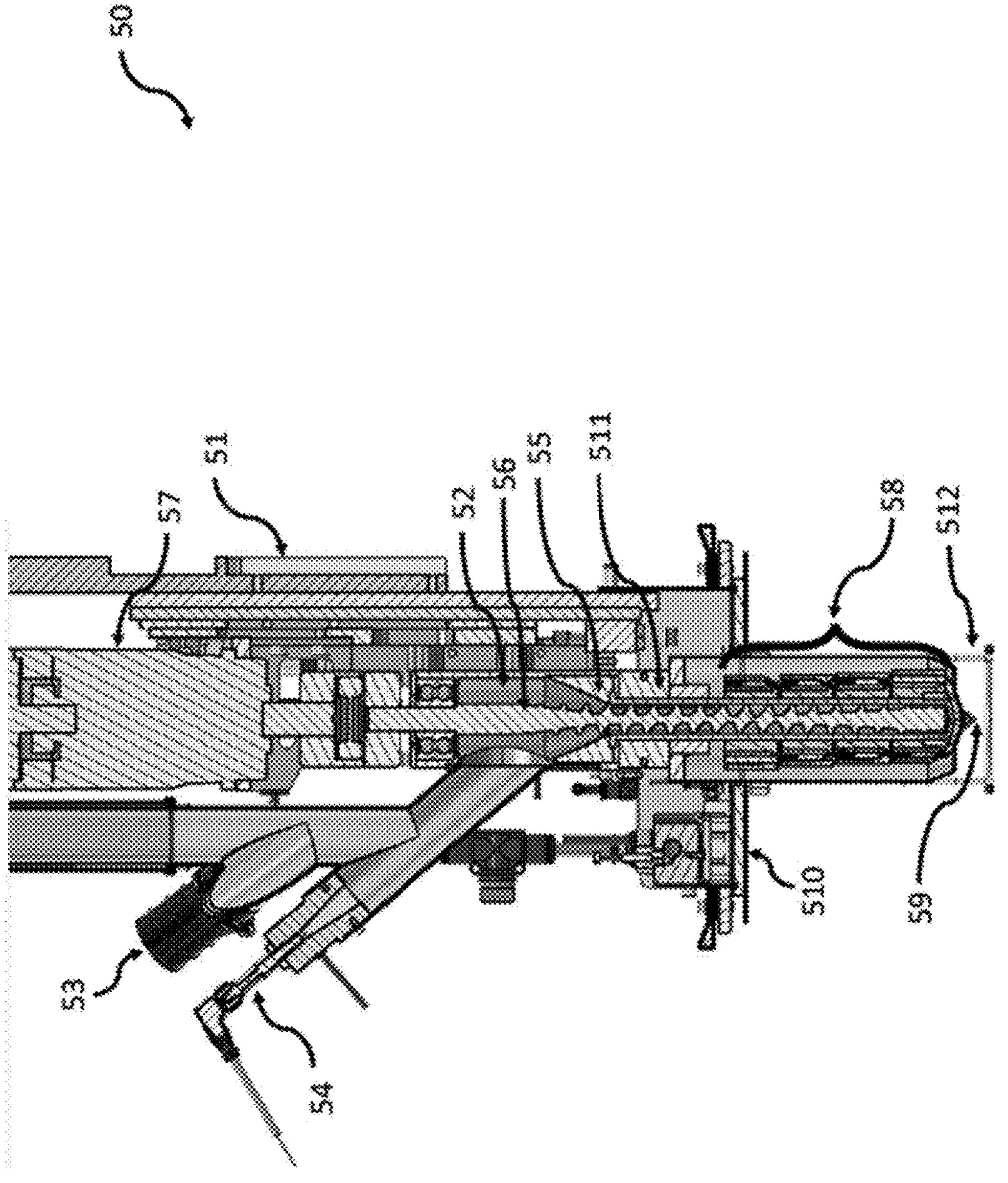
FIG. 5 shows a sectional view of an extruder column according to an embodiment of the disclosure.

Extruder assembly 25 (FIG. 2) may include a plurality of individual extruders 50. A cross-section view of one of the extruders 50, according to some embodiments, is shown in FIG. 5. Extruder 50 may include an extruder frame 51 which acts as a support for installing other extruder 50 equipment and also contains the necessary mechanical mechanism to aid extension and retraction of the extruder 50. Pellets from the pellet feeder system of FIG. 4 may be fed to the local pellet storage tank 52 through the pellet feed pipe 53 for temporary storage while the extrusion process proceeds. A pellet detection sensor 54 may also be attached to the pellet feed pipe 53 to detect the presence as well as the flow of the pellets into the extruder. The pellets from the local pellet storage tank 52 may then be fed to the pellet catching cone 55 through a specially designed screw 56 to enable serial dispensing of pellets for uniform extrusion and to prevent blockages. The speed and consistency of the extruded filament may be governed by the rotational speed of the screw 56 which may be controlled by a step motor 57, the speed of which can be adjusted, for example based on the type of print pellets and/or the size of the final object. A plurality of independently adjustable heater units 58 may heat the screw up to a desired temperature so that the pellets being transported downwards by the rotary motion of the screw 56 melt into a liquid before being extruded from the nozzle 59. A camera 510 may also be installed to visually monitor the extrusion process, and to report any blockages within the extruder 50. If the temperature of the screw 56 is detected to be higher than a desired value or a threshold value (for a certain type of print feed material type), a cooler 511 may be activated to bring down the extrusion cavity temperature to levels which would ensure the viscosity of the melted print feed to be at acceptable level for quality extrusion. Multiple cooling tubes 512 may also be installed just beneath the nozzle 59 to accelerate the cool down process of the extruded layers to ensure the final product has the required structural rigidity. Tables 1-3 show the extrusion performance of the designed extruder 50 for different types of print feed material. By independently adjusting the temperature of each of the individual heater units 58 extrusion of the print feed material was done at different extrusion speeds (v) to record the mean weight of the extruded sample, the standard deviation, estimated print speed (in g/hr) and percentage deviation.

Figure 6:
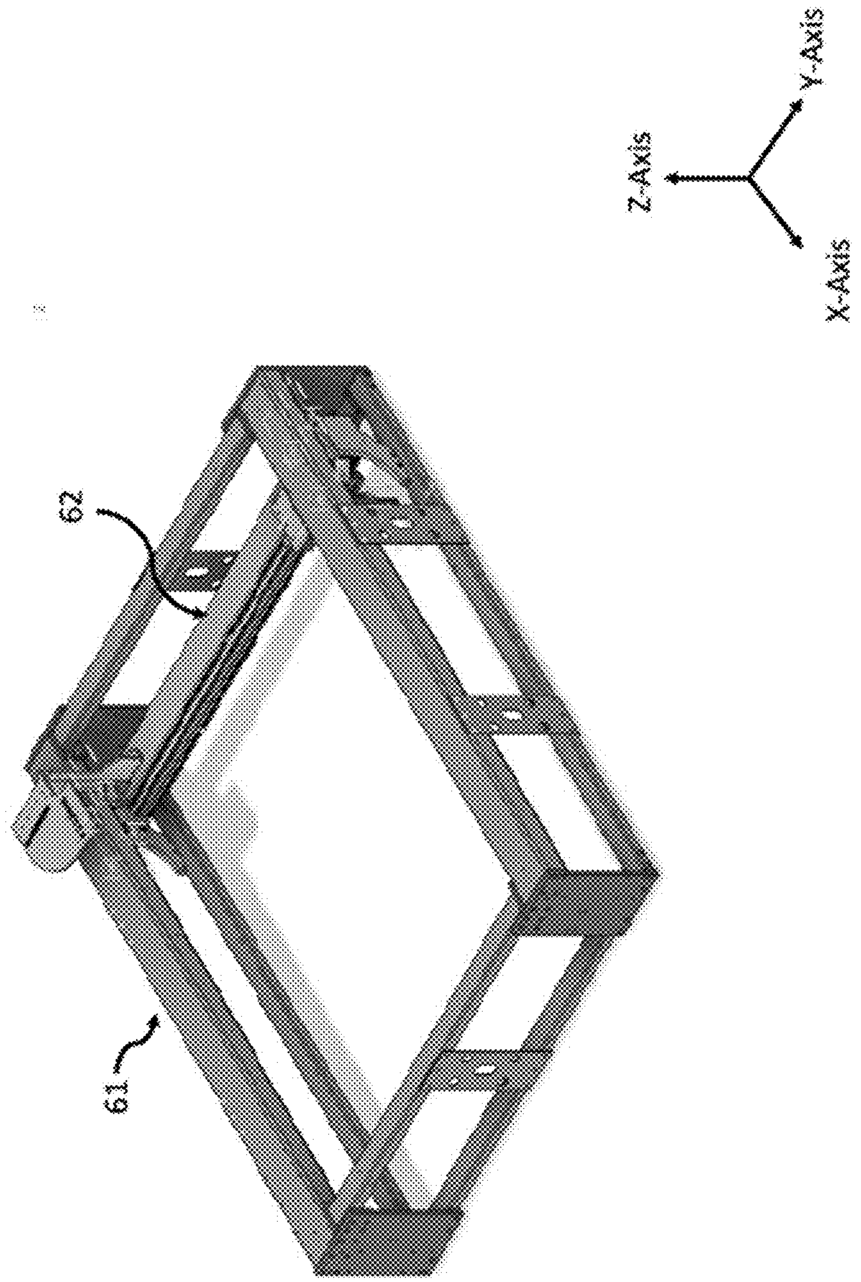
FIG. 6 shows a perspective view of a lightweight portal according to an embodiment of the disclosure.
Figure 7:
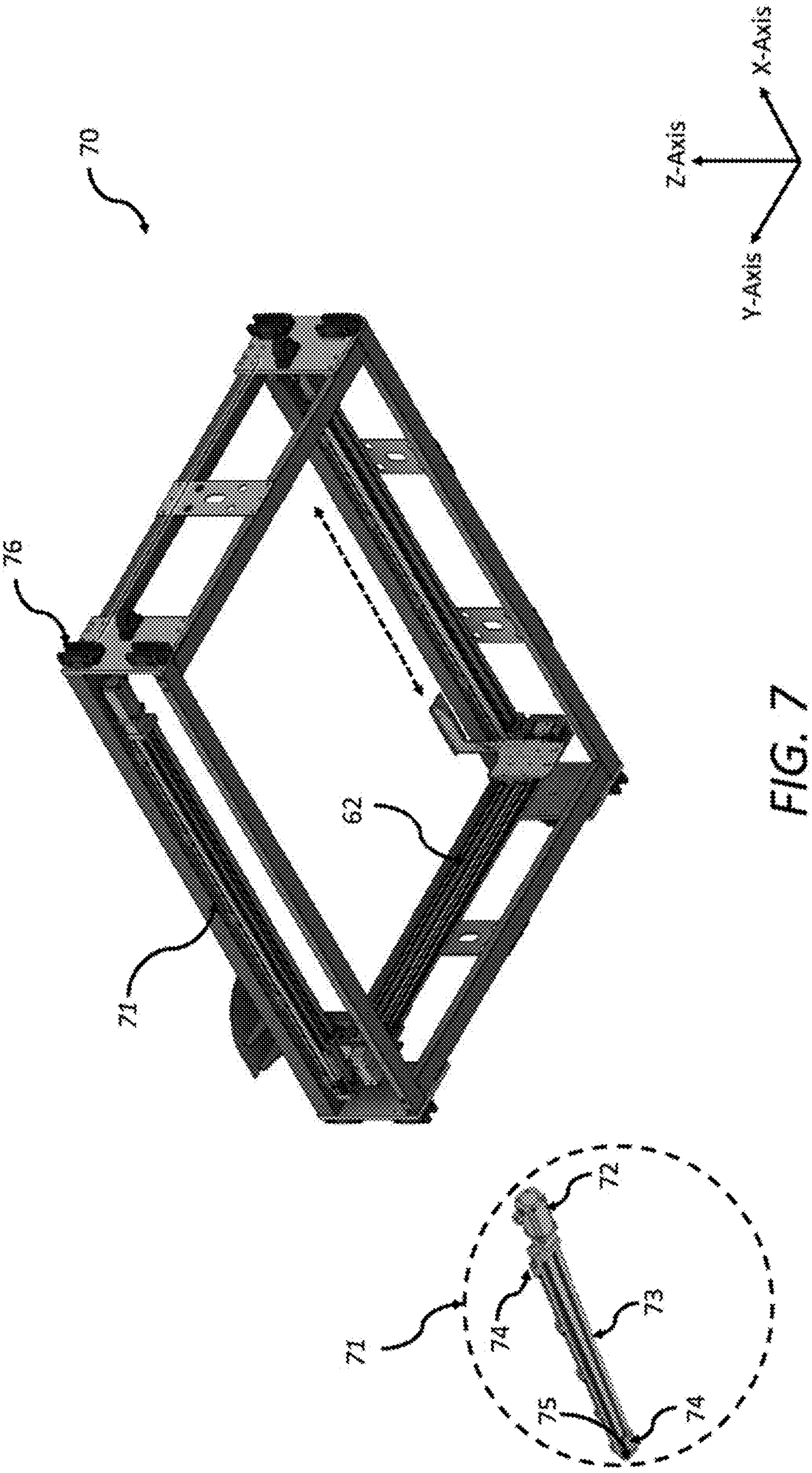
FIG. 7 shows a detailed view of a lightweight portal with XY-linear movement kinematics on view, according to an embodiment of the disclosure.

3D printing jobs often require movement of the extrusion assembly 25 (FIG. 2) in both the horizontal (XY-plane) as well as the vertical (Z-plane). Extrusion assembly 25 (FIG. 2) may be installed on a lightweight metallic portal, an example of which is shown in detail in FIG. 6. The portal may include a metallic frame 61 with a Y-axis magnetic rail 62 installed to ensure smooth movement of the extruder assembly 25 in the Y-axis. A complete view of an example portal 70 with X- and Y-axis kinematic mechanisms installed is shown in FIG. 7. In order to realize the movement in the X-axis, X-plane linear modules 71 may be installed on each of the two sides, corresponding to the X-axis, of the lightweight metallic portal 70. The X-plane linear modules 71 may include a linear motor or a servo motor 72 attached at one end of a linear guide rail 73, with a Y-axis mounting plate 74 installed at the opposite end, in some embodiments. One or more X-plane linear modules 71 (e.g., two, as shown) may be installed on opposite sides of the lightweight portal 70 through multiple mounting points 74 and may run along the X-axis according to the coordinates shown in FIG. 7. Each end of the V-axis magnetic rail 62 can bolt or otherwise be secured directly onto each of the individual V-Axis mounting plates 74 of the two identical X-plane linear modules. Once activated, each of the two X-plane servo motors 72 may synchronize their motion to move the V-axis magnetic rail 62 at a constant speed across the X-axis along the guide rails 73 as indicated by the arrows. Vertical (Z-plane) movement of the lightweight portal 70 may be realized by installing one or more linear modules (e.g., four, as shown) vertically across the four vertical arms of the main frame 21 (FIG. 2). The lightweight portal 70 may be suspended onto the Z-plane linear modules through mounting points 76 attached on each corner of the lightweight portal 70.

TABLE 1

Extruder performance for Polypropylene (PP) print feed with four individual heater units 58 operating at temperatures of 260° C., 250° C., 250° C. and 240° C. respectively.

| Extrusion Speed (v) | mm | Mean | Standard Deviation | Estimated Print Speed (g/hr) | Percentage Standard Deviation |
|---|---|---|---|---|---|
| 5000 | 500 | 2.36 | 0.21 | 1413.8 | 8.7 |
| | | 2.52 | 0.07 | 1510.9 | 2.7 |
| 3000 | | 2.58 | 0.14 | 927.1 | 5.3 |
| | | 2.45 | 0.13 | 882.3 | 5.3 |
| 1000 | | 2.76 | 0.11 | 330.8 | 3.9 |
| | | 2.75 | 0.20 | 329.4 | 7.1 |

TABLE 2

Extruder performance for Polyphenylene Sulfide (PPS) print feed with four individual heater units 58 operating at temperatures of 300° C., 310° C., 300° C. and 290° C. respectively.

| Extrusion Speed (v) | mm | Mean | Standard Deviation | Estimated Print Speed (g/hr) | Percentage Standard Deviation |
|---|---|---|---|---|---|
| 5000 | 500 | 6.00 | 0.30 | 3598.3 | 4.9 |
| | | 5.41 | 0.25 | 3246.0 | 4.7 |

TABLE 2-continued

Extruder performance for Polyphenylene Sulfide (PPS) print feed with four individual heater units 58 operating at temperatures of 300° C., 310° C., 300° C. and 290° C. respectively.

| Extrusion Speed (v) | mm | Mean | Standard Deviation | Estimated Print Speed (g/hr) | Percentage Standard Deviation |
|---|---|---|---|---|---|
| 3000 | | 5.41 | 0.27 | 1948.5 | 5.0 |
| | | 5.18 | 0.35 | 1863.4 | 6.8 |
| 1000 | | 6.69 | 0.43 | 802.5 | 6.5 |
| | | 6.67 | 0.16 | 800.4 | 2.4 |

TABLE 3

Extruder performance for Acrylonitrile Butadiene Styrene (ABS) print feed with four individual heater units 58 operating at temperatures of 240° C., 250° C., 240° C. and 190° C. respectively.

| Extrusion Speed (v) | mm | Mean | Standard Deviation | Estimated Print Speed (g/hr) | Percentage Standard Deviation |
|---|---|---|---|---|---|
| 5000 | 500 | 3.19 | 0.12 | 1912.3 | 3.6 |
| | | 3.02 | 0.14 | 1813.6 | 4.7 |
| 3000 | | 2.02 | 0.22 | 727.2 | 10.8 |
| | | 2.67 | 0.47 | 959.5 | 17.7 |

Figure 8:
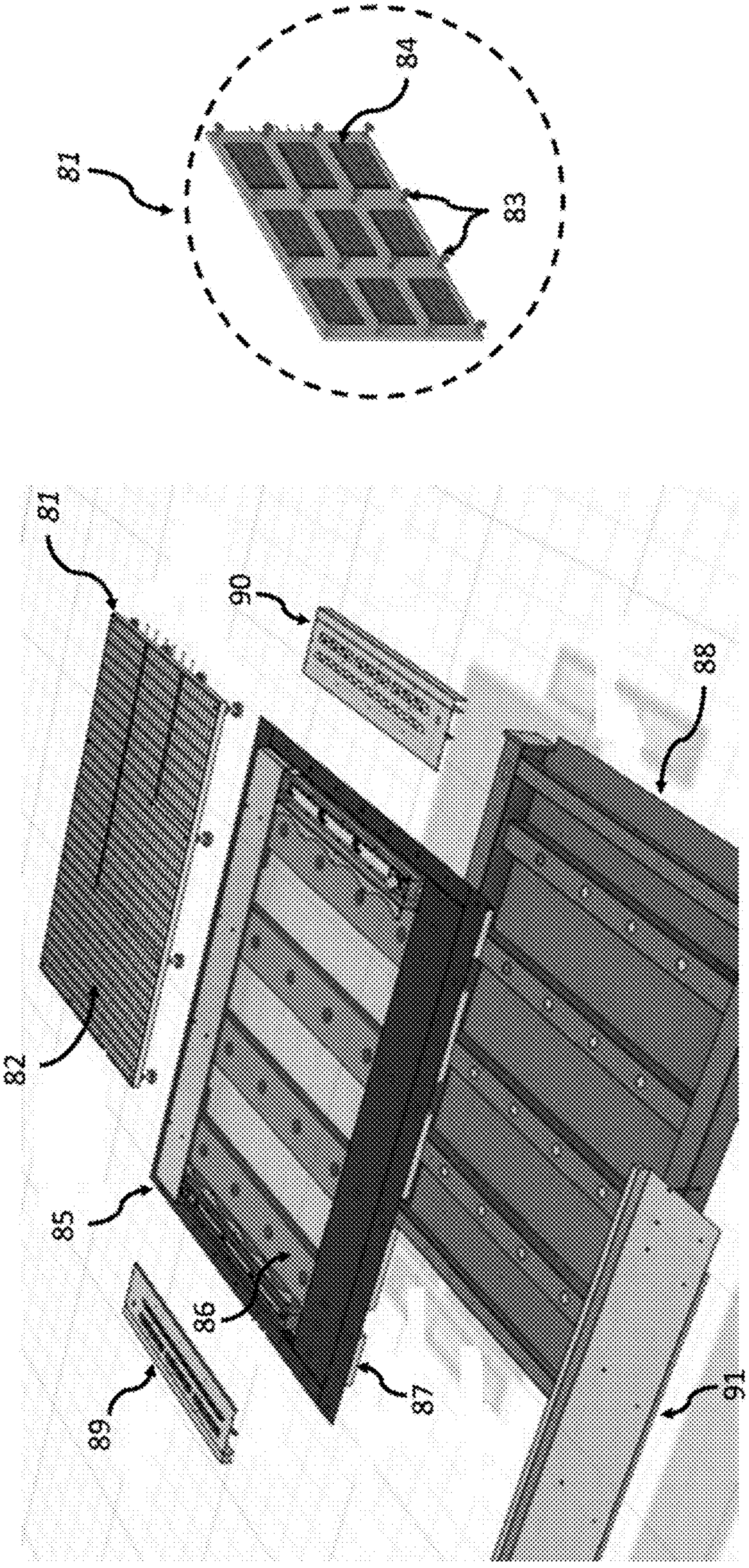
FIG. 8 shows an exploded view of a heated print bed and its installation according to an embodiment of the disclosure.

The heated print bed or the thermal vacuum table or the print bed may be shaped as a flat, rectangular surface and may be made of aluminum or glass. The heated bed may be fixed onto the 3D printer's build platform and functions as the work bench where the actual 3D printing takes place. FIG. 8 shows a complete print bed assembly according to an embodiment of the disclosure. The installation may include an aluminum thermal print bed 81 with dedicated channels 82 milled on the surface to form a mesh of varying dimensions to create and maintain a vacuum under the working surface when printing starts. A grid of special surface heating elements embedded directly onto the aluminum sheet of the thermal vacuum table enables heating of the thermal table surface. The bottom side of the thermal vacuum table 81 may have multiple table supports 83 and a plurality of vacuum tanks 84 installed to maintain the vacuum on the table surface. The thermal print bed 81 can sit securely on a convector frame 85 including multiple vacuum receptors 86 to interface directly to the corresponding vacuum tanks 84 of the thermal vacuum table 81. Multiple thermal protection sheets 87 at the bottom of the convector frame 85 can help protect heat dissipation outside of the convector assembly. The convector frame 85 may be securely bolted or otherwise secured onto the bottom panel 88 of the main 3D printed frame 22 (FIG. 2). Decorative covering panels 89, 90, and 91 may be provided and may conceal the gaps between the components, providing a tight fit appearance. Once a desired temperature is set, the heating elements inside the thermal vacuum table 81 may be activated and may heat the surface of the thermal vacuum table 81 to the desired surface temperature.

Figure 9:
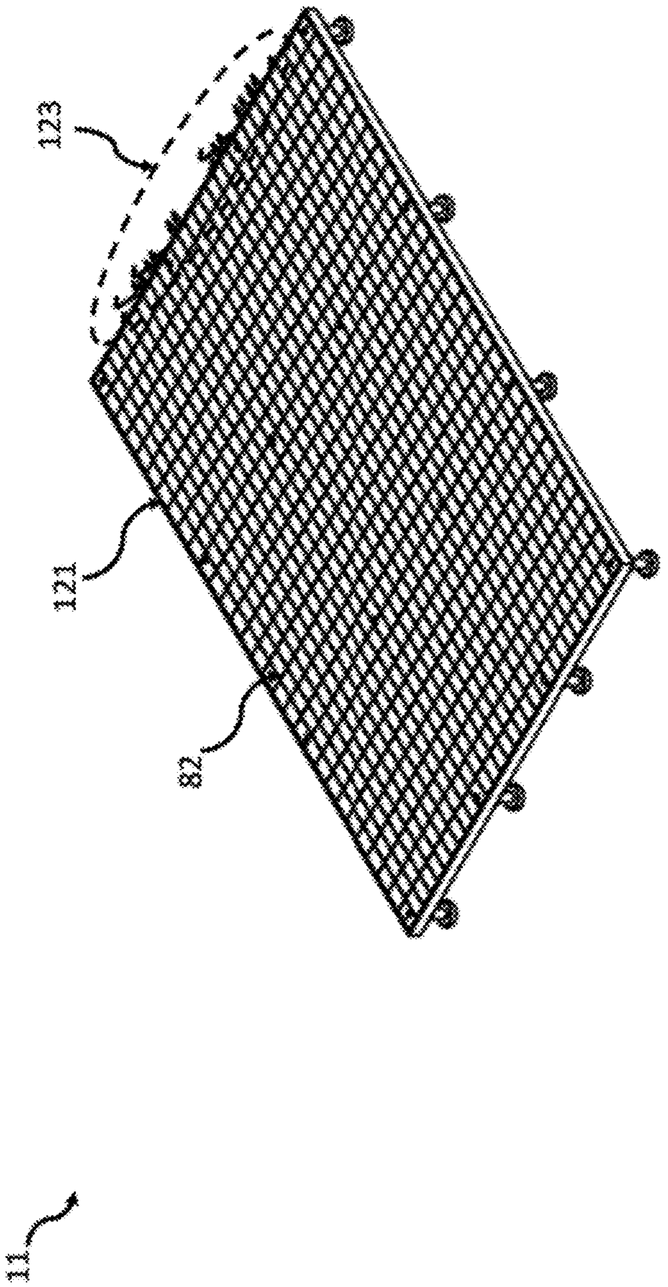
FIG. 9 shows a perspective view of the top surface of the heated vacuum table according to an embodiment of the disclosure.
Figure 10:
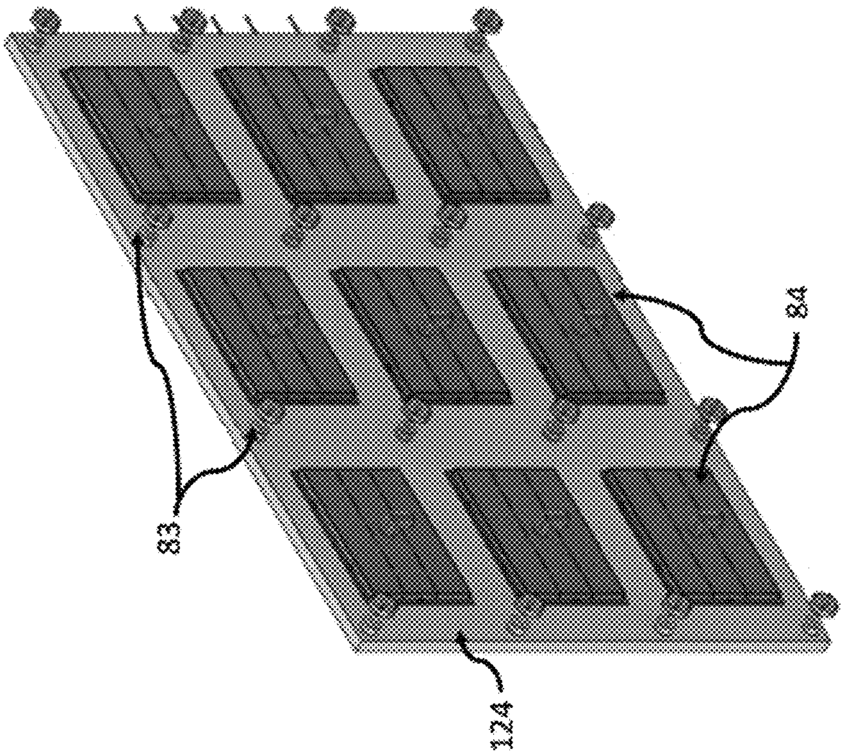
FIG. 10 shows a perspective view of the bottom side of the heated vacuum table according to an embodiment of the disclosure.

FIGS. 9-10 show the perspective views displaying the top and bottom sides of the heated vacuum table 11. The top surface of the heated vacuum table 121 can include one or more vacuum channels 82 engraved throughout the surface area of the heated vacuum table 11. One or more heating elements can be installed on the table surface by pouring onto the molten aluminum during the table creation process. These channels can be used to generate the required suction necessary to maintain a desired level of adhesion of the 3D printed object to the heated vacuum table 11. One or more vacuum tanks 84 can be installed on the bottom side 124 of the heated vacuum table 11. Vacuum feeding lines 123, running between the vacuum tanks 31 and a vacuum generator, may provide the necessary vacuum required for suitable adhesion. The weight of the entire heated vacuum table 11 can be supported by multiple supports 83 that may be made of stainless steel or other suitable material and that may be designed to be bolted in place within the thermal insulated housing 112, for example.

Figure 11:
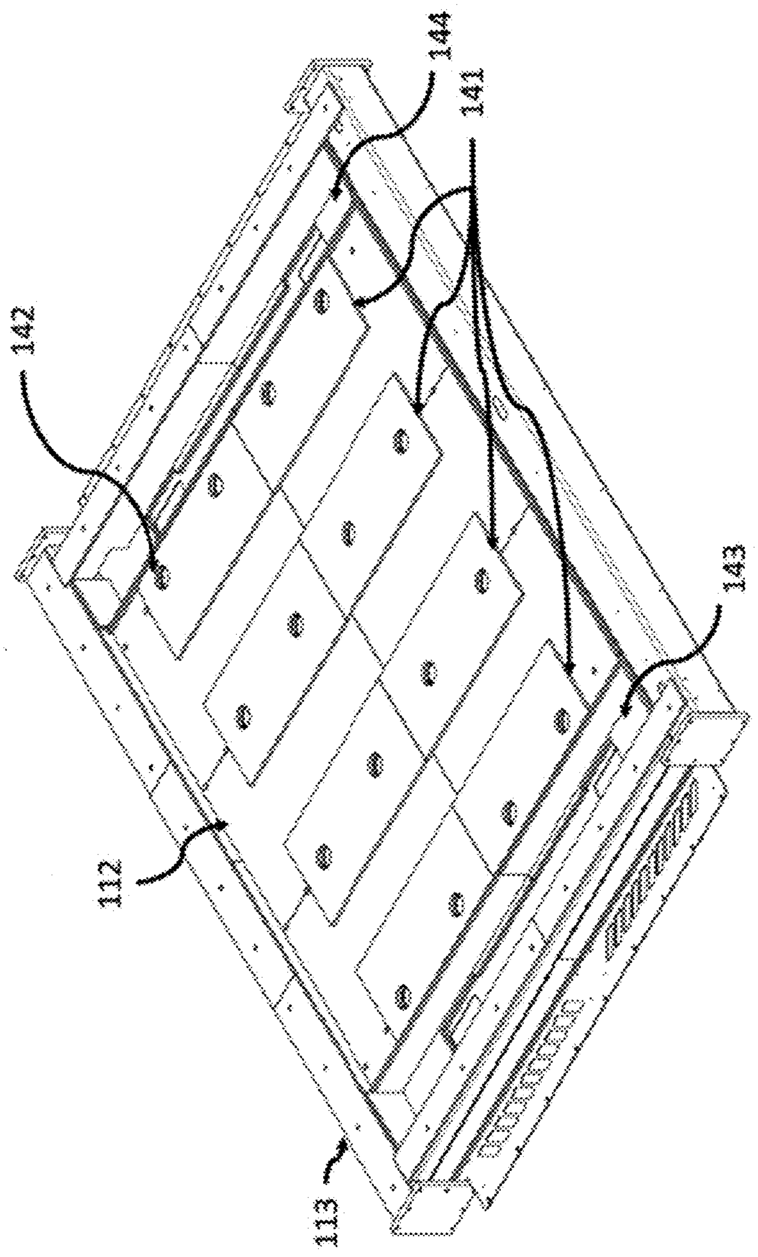
FIG. 11 shows a perspective view of the thermal insulated housing according to an embodiment of the disclosure.
Figure 12:
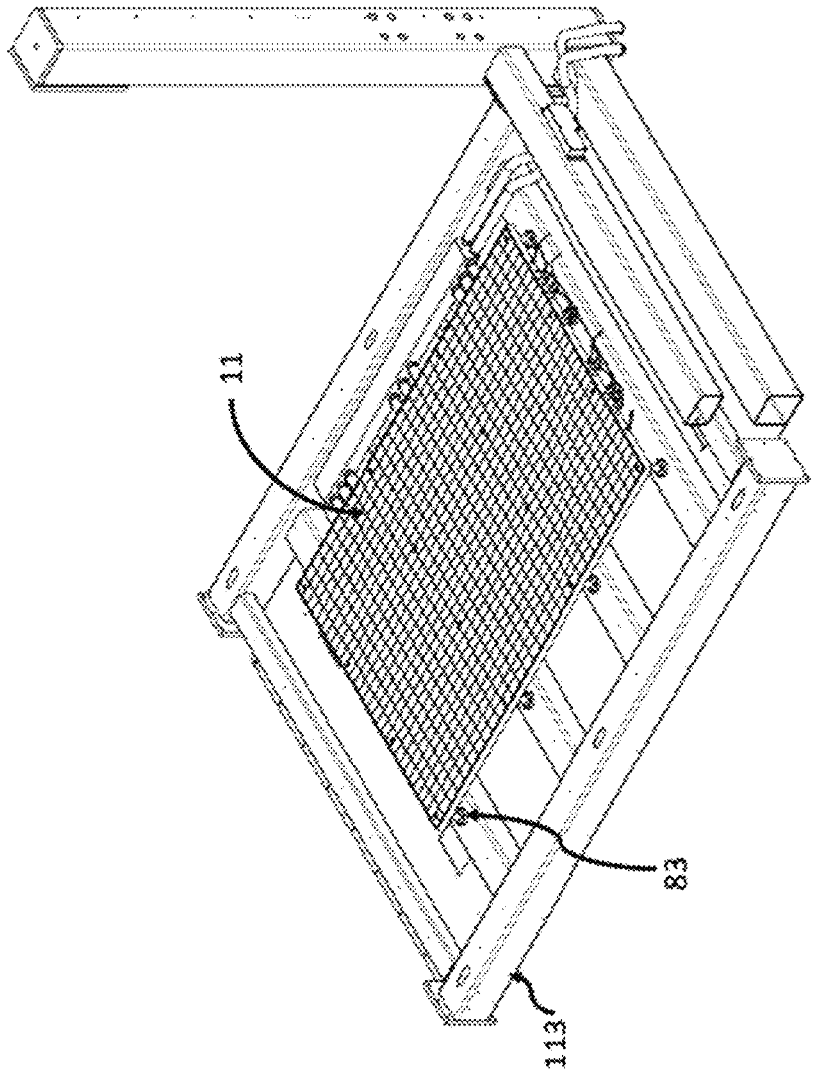
FIG. 12 shows a perspective view of the heated vacuum table assembly installed within the main frame of the 3D printer according to an embodiment of the disclosure.

FIG. 11 shows a perspective view of the thermal insulated housing 112 firmly installed within the 3D printer internal frame 113. The thermal insulated housing 112 can include multiple (e.g., four) mounting plates 141 (in this example, identical and equally spaced), welded along the width of the thermal insulated housing 112. Multiple bolting points 142 may be provided on each of the mounting plates 141 which may act as receptables for the equal number of conforming stainless-steel supports 83 installed on the bottom side 124 of the heated vacuum tables 11. Cavities 143 and 144 (in this example, identical cavities) on either side of the thermal insulated housing 112 may hold the convector setups installed to generate and maintain the desired heating levels within the heated chamber. A perspective view of the entire heated vacuum table assembly installed within the main frame 113 of the 3D printer is provided in FIG. 12. The heated vacuum table 11 may be bolted onto the thermal insulated housing 112 via the multiple stainless-steel supports 83 as indicated in FIG. 12.

Figure 13:
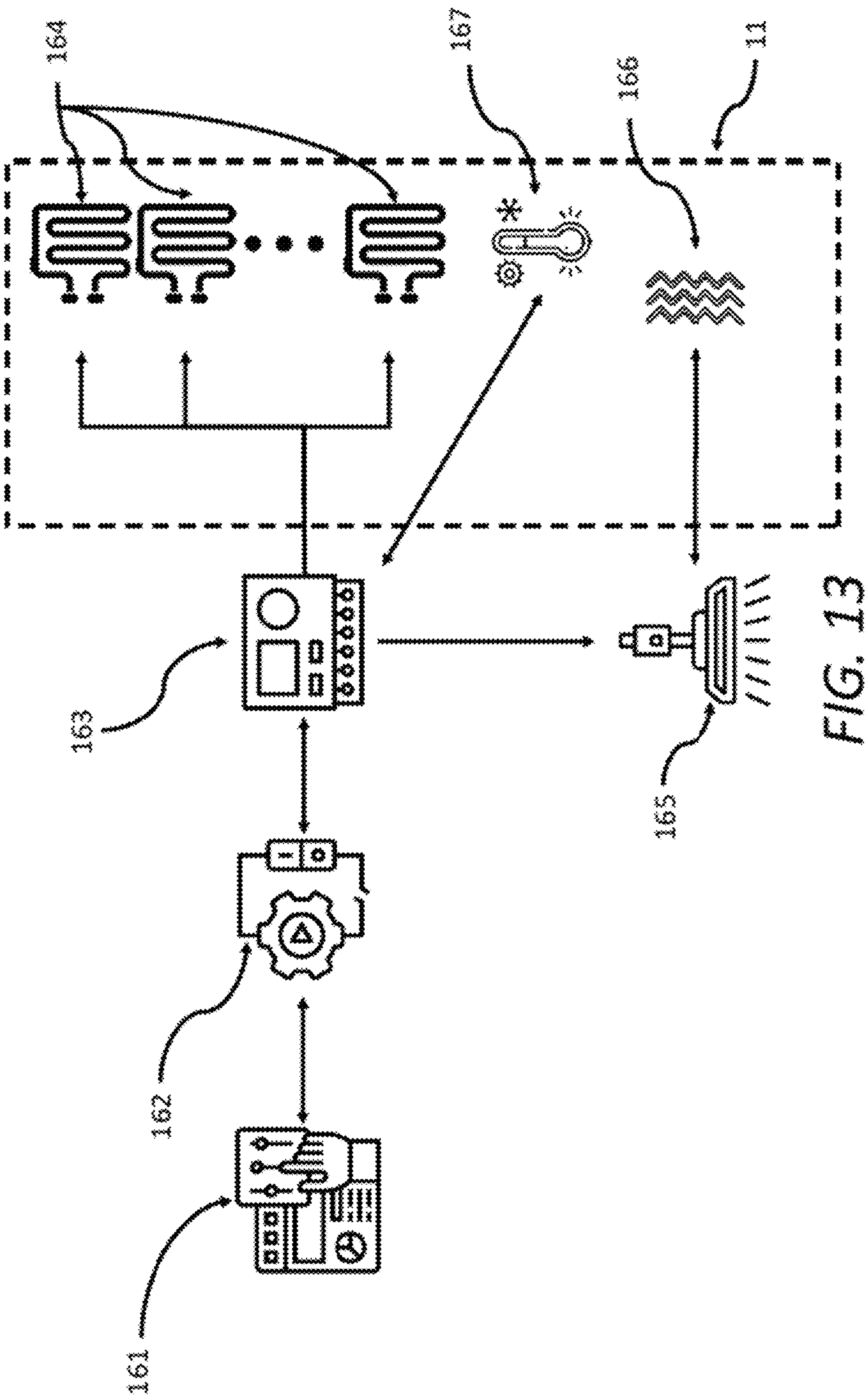
FIG. 13 presents a block diagram depicting the operation of the heated vacuum table according to an embodiment of the disclosure.

The functioning of the heated vacuum table 11 is depicted in the block diagram of FIG. 13. The operator may set the required surface temperature through one of the multiple 3D printer user interfaces 161. The main control circuitry 162 of the 3D printer may activate and may command the local controller 163, which in turn may activate the multiple embedded heating elements 164 of the heated vacuum table 11, gradually raising the surface temperature of the heated vacuum table 11. At the same time, depending on the type of print feed being used for the particular print job, the local controller 163 may also activate the vortex blower 165 which may pump air through the vacuum receivers 166, initiating the adhesion process on the heated vacuum table 11 surface. Once the temperature rises to the required value, as reported by the surface temperature sensor 167, the heating may be stopped, and the process may be kept regulated by the local controller 163.

Figure 14:
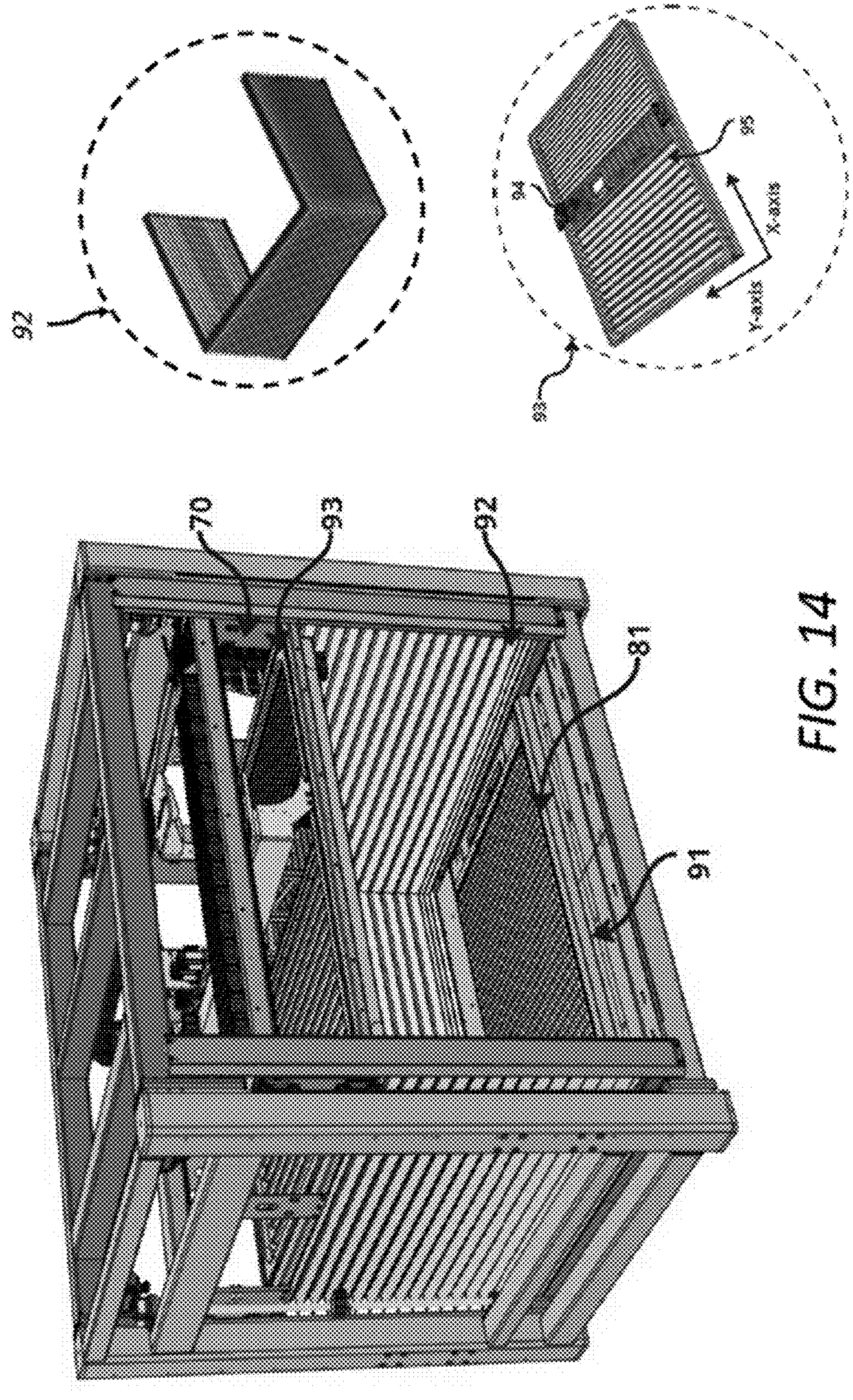
FIG. 14 shows a snapshot of a final thermal vacuum chamber with XY- and Z-axis insulation shields according to an embodiment of the disclosure.

The heated build chamber can encompass all the different functional components of the 3D printer 10 described earlier. The heated build chamber can ensure a certain constant temperature as the print process continues. Regulating the ambient temperature ensures proper adhesion of the multiple printed layers while decreasing the brittleness of the fabricated structure. The heated build chamber may include cavity 91 created between the lightweight portal 70 and the heated print bed 81 as shown in FIG. 14. A corrugated insulation shield 92, which may be manufactured from an aluminized glass fabric in some embodiments, may be installed to insulate one or more sides of the cavity (e.g., the three sides of the cavity as shown in FIG. 14). The top of the corrugated insulation sheet can be attached to the lightweight portal 70 such that as the portal moves in the Z-axis, the corrugated sheet also folds/expands while maintaining the integrity of the heated build chamber. The top surface of the chamber 93 can be insulated, for example using a specially designed rubberized or covered with fluoroplastic glass fabric allowing for the X- and Y-plane movements of the extrusion assembly. As the extruder assembly 25 (FIG. 2) moves along the X-plane, the entire Y-plane corrugated channel 94 can move along the X-plane by expanding/contracting the corrugations 95 as required. Y-Axis movement of the extruder assembly can be realized by the expansion/contraction of the corrugated structure attached on the Y-plane corrugated channel 94. In order to monitor and control the temperature inside the heated build chamber 91, a series of convectors may be installed on the convector frame 85 (FIG. 8) and may be concealed by covers 89 and 90. The convectors can operate by heating and circulating the air within the heated build chamber 91.

Figure 15:
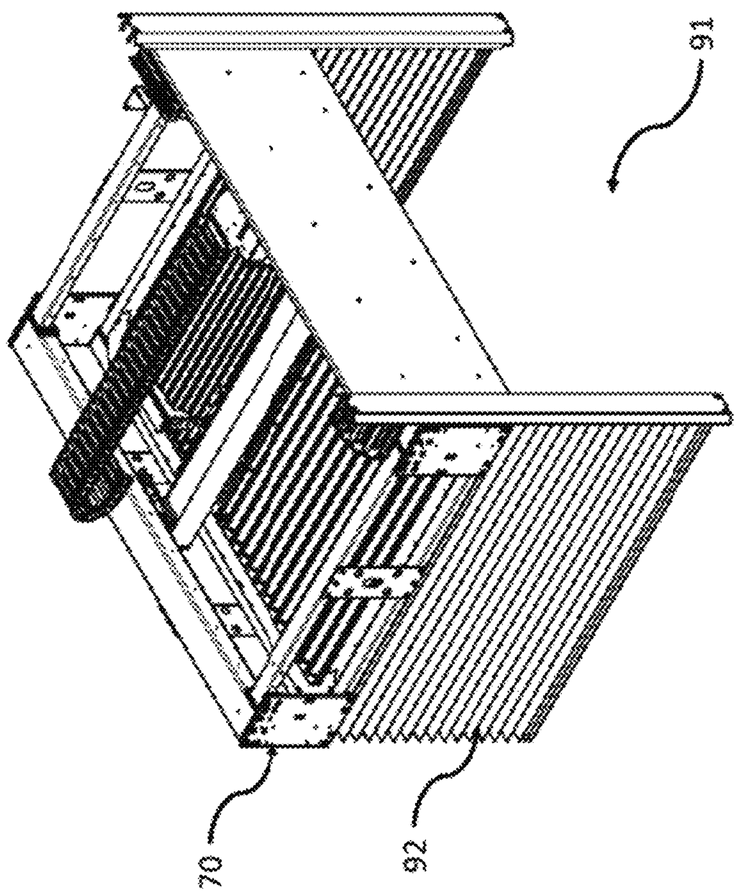
FIG. 15 shows a perspective view of the heated build chamber with the additional components removed according to an embodiment of the disclosure.

FIG. 15 shows a detailed view of heated build chamber 91 without the rest of the 3D printer components. The heated build chamber 91 may be created with the kinematics portal 70 on top. Specially formulated corrugated rubberized or covered with fluoroplastic plastic insulation sheets 92 may form the three sides of the heated build chamber 91 with the top and the bottom ends of the corrugated rubberized plastic insulation sheets 92 firmly attached to the kinematics portal 70 and the bottom end of the main frame 21, respectively.

Figure 16A:
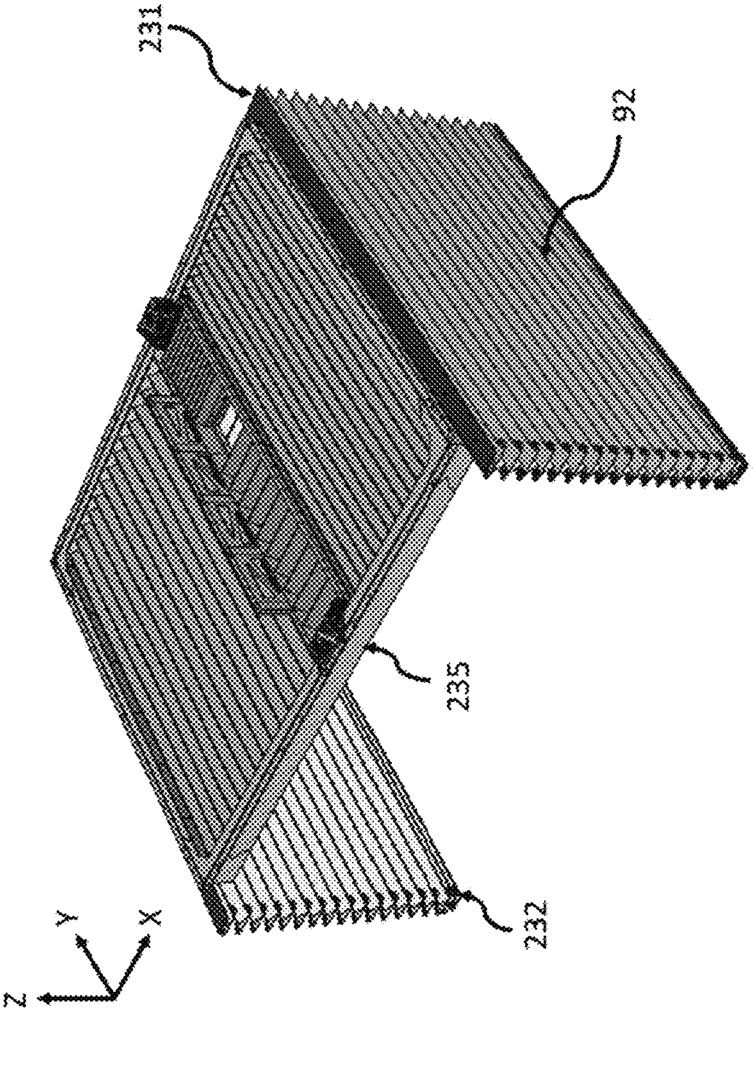
FIG. 16A shows the corrugated rubberized or covered with fluoroplastic plastic insulation forming the sides of the heated build chamber according to an embodiment of the disclosure.
Figure 16B:
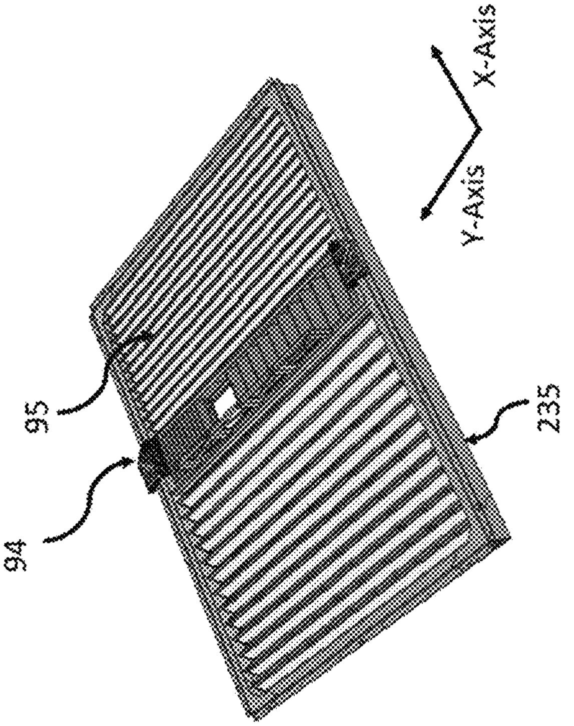
FIG. 16B shows the corrugated insulation shield forming the top of the heated build chamber according to an embodiment of the disclosure.
Figure 17B:
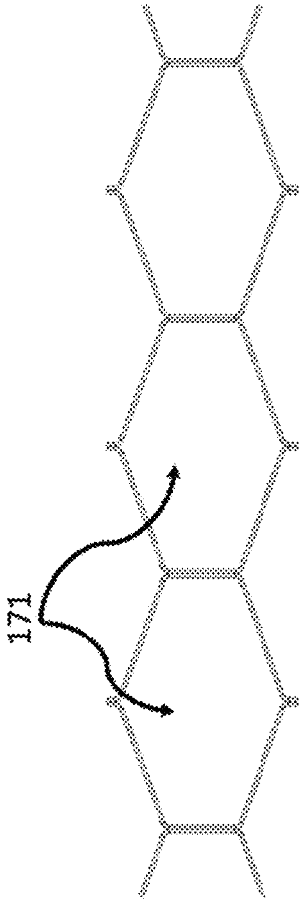
FIG. 17B shows the side view of the corrugated fluoroplastic insulation structure adopted for the XY-plane insulation depicting the weaving pattern.
Figure 17A:
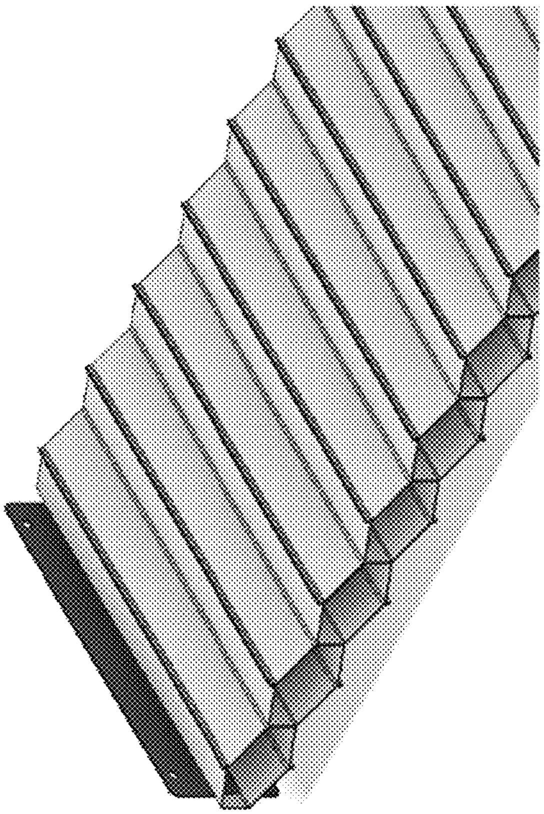
FIG. 17A shows a perspective view of the corrugated fluoroplastic insulation structure adopted for the XY-plane thermal insulation.

FIGS. 16A-16B show detailed views of thermal shields forming the outer periphery of the heated build chamber 91 of FIG. 15. FIG. 16A shows the three sides that may form the corrugated rubberized or covered with fluoroplastic insulation 92 of the heated build chamber 15. The top 231 and the bottom 232 sides of the corrugated rubberized insulation 92 may be firmly attached to the lower end of the kinematics portal 70 and the bottom end of the main frame 21, respectively. During the printing process, any vertical (Z-plane) movements of the kinematics portal 70 may result in either contraction or expansion of the corrugated rubberized or covered with fluoroplastic insulation 92 along the engraved corrugations, while maintaining the insulation levels without restricting the kinematics portal 70 movements. The top surface of the heated build chamber 91 may be covered by a specially designed lightweight rectangular metal frame 235 with two different, and independently moving corrugated structures 94 and 95, installed within a lightweight rectangular metal frame 235 as shown in FIG. 16B. The lightweight metal frame 235 may be installed under the kinematics portal 70 with the top 231 of the corrugated insulation 92 attached to it. The corrugated insulation 92 may be constructed from a rubberized or fluoroplastic material (PTFE for example) with a two-layered structure weaved together such that multiple corrugation cells 171 form throughout the corrugated insulation 92 shield as shown in FIG. 17B. The pattern is shown in the perspective view of FIG. 17A, and the side view of FIG. 17B. The narrow corrugated thermal shield channel 94 may provide an opening wide enough for the extrusion assembly to extend into the heated build chamber 91, with the Y-axis movement of the extrusion assembly provided by the narrow corrugated thermal shield channel 94. The X-axis movement of the extrusion assembly may be provided by the wider corrugated thermal shield channel 95. The combination of the two thermal shield channels 94 and 95 may ensure obstruction-less movement for the extrusion assembly while limiting heat dissipation through the top of the heated build chamber 91.

Figure 18:
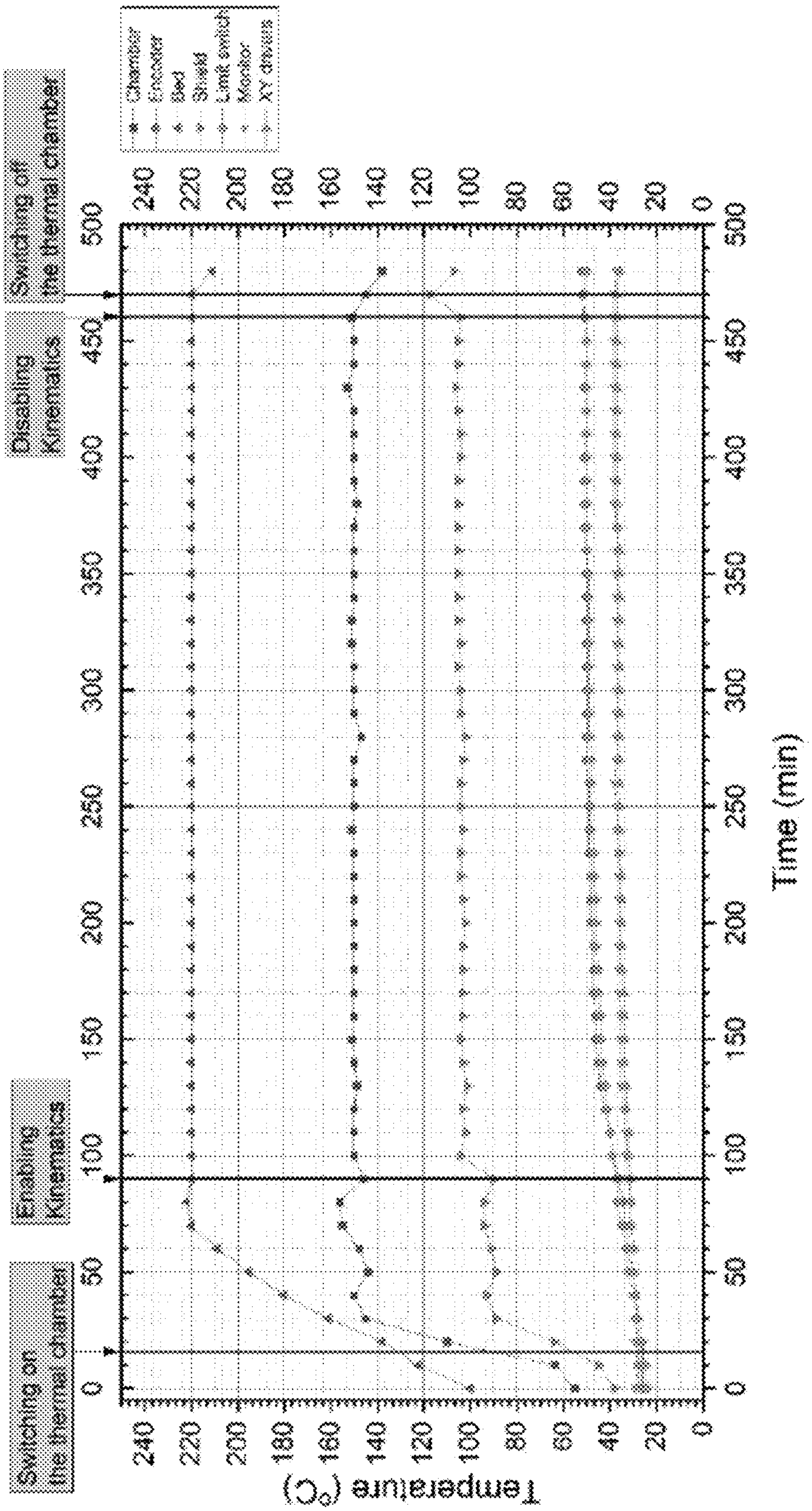
FIG. 18 shows a plot depicting the temperature retention abilities of the XY-plane corrugated fluoroplastic insulation.

FIG. 18 shows the temperature retention performance of the different components of the disclosed device. The plot shows the temperature at different places within the heated build chamber 91 with the corrugated insulation 93 in place. For the entire test duration of 137 minutes, temperature readings at four distinct locations may be provided: TC1—inside the insulated chamber, TC2—outside the chamber and above the corrugated insulation 93, TC3 and TC4—within the corrugation cells 171. It is evident from FIG. 18 that the newly designed corrugated insulation 93 serves as an effective thermal shield by maintaining the temperature within the heated build chamber 91. The colors on the graph show the following: blue—temperature of the thermal bed, black—temperature of the heating chamber, green—temperature inside the printer above the corrugated shield, red—temperature near the Y-axis magnetic encoder, purple—temperature near the X-axis rail end switch, yellow—temperature inside the printer behind the screen, turquoise—temperature inside the electrical panel. The test was conducted for 8 hours with the chamber setpoint set at 150° C. and achieved in 20 minutes and the bed setpoint of 220° C. and achieved in 1.5 hours. After the temperatures stabilized at 85 minutes of the test, kinematics started at 660 mm/s speed. During the test, the temperatures inside the printer stabilized at the following values: 105° C. above the corrugation, 50-51° C. at the magnetic encoder and X-axis end terminal, 37° C. inside the electrical panel and 38° C. behind the printer screen. The operation of kinematics portal 70 was observed to be stable for more than 6 hours at the X-axis loads of 32% slave, 45% master and 8% Y-axis. According to the test results, the kinematics portal 70, heating build chamber 27 and heated print bed 29 worked stably for more than 6 hours at preset chamber temperatures of 150° C. and 220° C.

Figure 19:
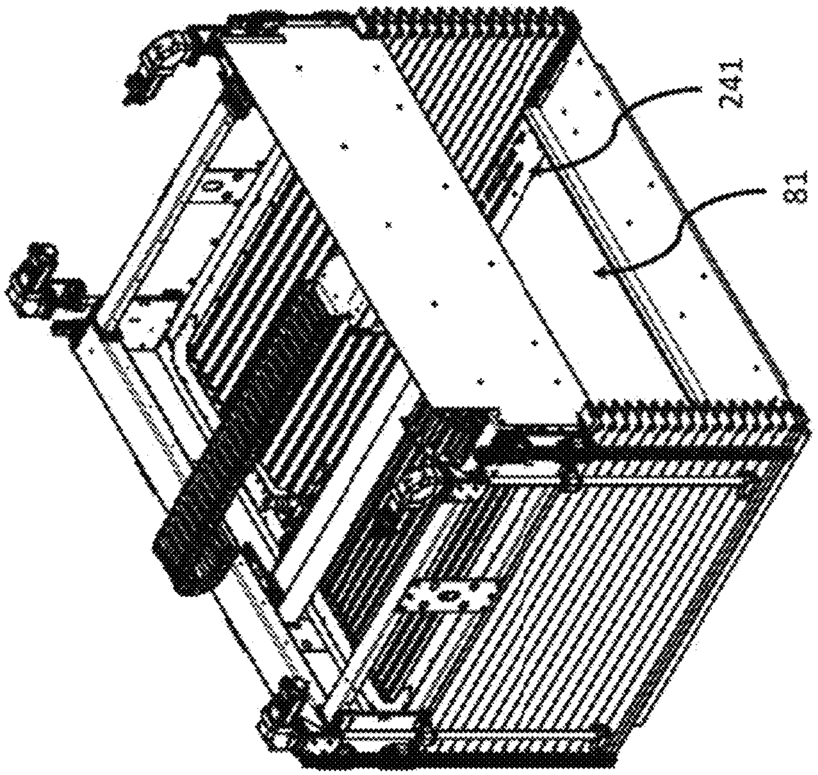
FIG. 19 shows a perspective view of the heated build chamber with the additional components removed according to an embodiment of the disclosure.

In order to generate and maintain the desired temperature levels within the heated build chamber, one or multiple convectors 241, which may be supported by tangential or another type of fans, may be installed on either side of the heated vacuum table 81 as shown in FIG. 19. The convectors may include one or more heating elements (e.g., multiple 9 kW tubular heating elements) whose heat output may be circulated within the heated build chamber by the fans installed on either side of the heated vacuum table 81.

Figure 20:
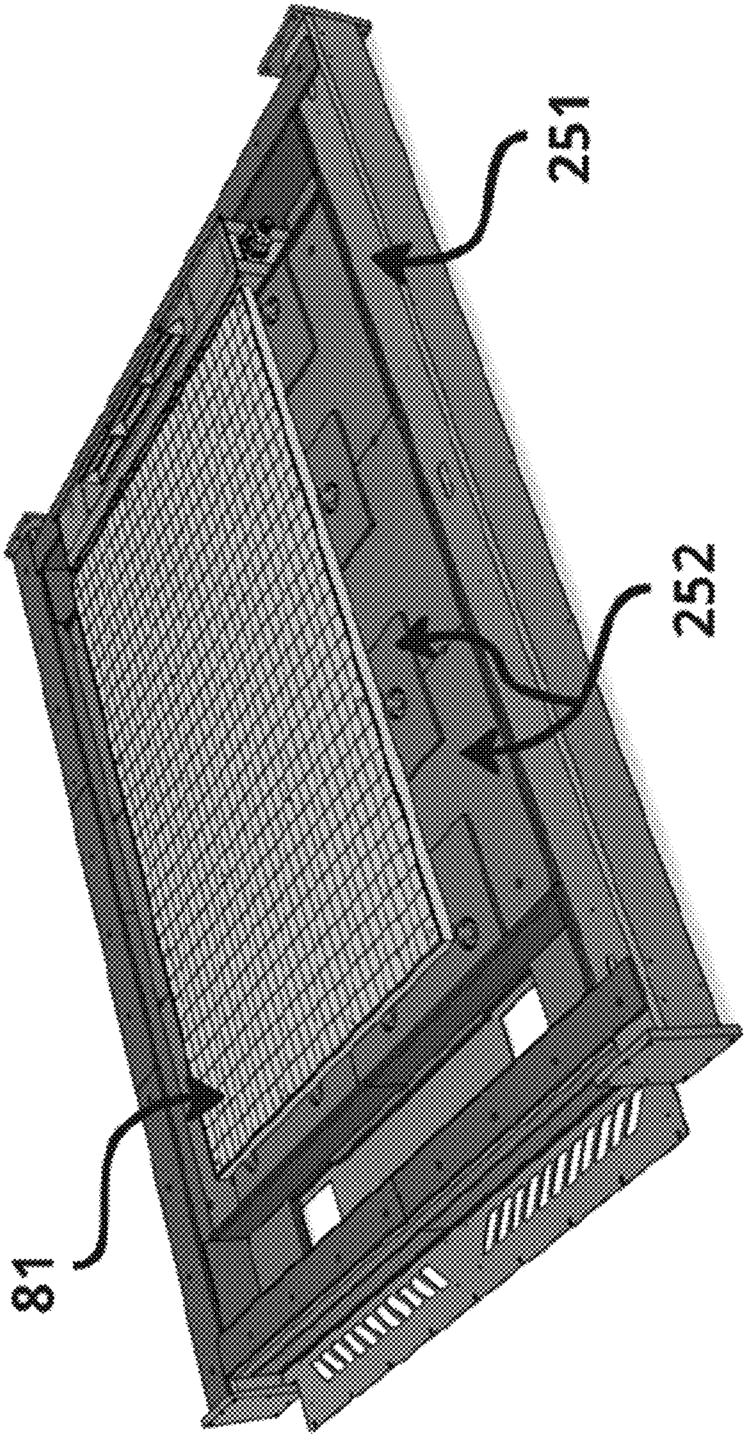
FIG. 20 shows a snapshot of the thermal insulation installed under the heated vacuum table according to an embodiment of the disclosure.

FIG. 20 shows a snapshot of the thermal insulation that may be installed under the heated vacuum table 81. A lightweight frame 251 may form the base of the heated build chamber and may contain the heated vacuum table 81 installed in it. One or more rugged pillows 252 stuffed with kaolin wool or another suitable substance may be installed under the heated vacuum table and/or within the vacant spaces in the lightweight frame 51. The rugged pillows 252 may form an insulation layer protecting heat dissipation from under the heated vacuum table 81.

It is to be understood that the present disclosure is not limited to the embodiments described above but encompasses any and all embodiments within the scope of the following claims. Numerous modifications and variations of the present disclosure are possible in light of the above teachings. It is therefore to be understood that, within the scope of the following claims, the disclosed details maybe practiced otherwise than as specifically described herein.

The disclosed embodiments have been designed to be used for (1) rapid prototyping in material science, aerodynamics, hydrodynamic, engineering research and any disciplines requiring fast iteration of test products; (2) modelling from digital models to physical representations in architecture, engineering, education, art and design; (3) tooling and full production in automotive, aviation, aerospace and space exploration, shipping and maritime, defense, energy, oil and gas, mining, medical equipment, healthcare, footwear, consumer goods, architecture (architectural elements and replacement elements for restauration), film and theatre industries (decorations and prosthetics), and art and design including generative design for any industrial sector, furniture design, small and large-scale art objects, fashion apparel items, footwear, headward and jewelry or decorative elements, especially items with complex geometry. It will be understood that the disclosed embodiments may have additional or different uses beyond or instead of those in this list.

The disclosed embodiments may be compatible with all known forms of investment casting, small-batch manufacturing, and in-situ manufacturing for hospitals, dental surgeries, construction sites, on the board of a shipping vessel or submarine, marine port warehouse, oil platforms and off-shore structures, oil and gas fields, mining cites, remote and extreme environments including Arctic and Antarctic stations and space exploration, military settings (e.g. specialized equipment, drones and replacement parts manufacturing using broken down units), among other things.

The embodiments described herein may offer advantages in higher isotropy of printed objects regarding of their size due to innovative integration of an active chamber alongside multiple atmosphere conditioning systems, together with an advanced kinematic system optimized for high-speed, large-scale production at a maximum resolution of 50 μm, all while preserving the highest degree of isotropy within its class. The capacity to print from thermoplastic and composite particles, pellets, or granules may enable a significantly broader range of thermoplastic materials compared to filament-based systems, encompassing even those plastics that cannot be utilized in filament form (e.g., brittle thermoplastics) as well as high internal viscosity or thixotropy compositions with the flow properties similar to those of Newtonian fluids, for example.

The embodiments described herein may comprise full-cycle equipment, which may include the preparation of the printing materials and postproduction by seamlessly integrating with pre-production and post-production devices into a single ecosystem that minimizes additional purchase and maintenance costs and provides the user with pretested and fine-tuned process. The design and set-up of embodiments disclosed herein may allow for shredding and reuse of the printed objects of any size, unfinished filament spools, spool holders, and enclosures, eliminating the intermediary step of filament production reducing material waste and pollution, for example.

The invention claimed is:

1. A 3D printer comprising:
a frame;
at least one panel removably coupled to the frame and defining a printing enclosure;
a heated build chamber within the printing enclosure, wherein:
the heated build chamber is defined by a movable portal coupled to the frame and at least one corrugated insulation sheet coupled to the portal and configured to expand and contract with vertical movement of the portal, and the at least one corrugated insulation sheet comprises a composite fabric material containing aluminum and a rubberized plastic, and/or
a top of the heated build chamber comprises a glass insulation with aluminum and rubberized plastic additives;
a heated print bed defining a bottom of the heated build chamber;
an extruder assembly configured to move within the heated build chamber; and
at least one pellet feeder configured to feed pellets of work material to the extruder assembly.

2. The 3D printer of claim 1, further comprising at least one tether point disposed on an external area of the 3D printer.

3. The 3D printer of claim 1, further comprising at least one display element disposed on an external area of the 3D printer and configured to display operating information of the 3D printer.

4. The 3D printer of claim 1, wherein the heated print bed comprises:
a top side including a surface with at least one vacuum channel formed therein;
at least one heating element coupled to and/or integrated with the surface;
a bottom side opposite the top side; and
at least one vacuum tank coupled to the bottom side and configured to form a vacuum within the at least one vacuum channel.

5. The 3D printer of claim 4, wherein the heated print bed further comprises at least one vacuum generator and at least one vacuum feeding line coupling to the at least one vacuum generator with the at least one vacuum tank.

6. The 3D printer of claim 4, wherein the heated print bed further comprises a thermal insulated housing configured to house the surface.

7. The 3D printer of claim 4, wherein the heated vacuum table further comprises at least one support coupling the bottom side with the thermal insulated housing.

8. A method comprising:
heating a build chamber and a print bed of a 3D printer comprising a frame, at least one panel removably coupled to the frame and defining a printing enclosure, the heated build chamber within the printing enclosure, the heated print bed defining a bottom of the heated build chamber, an extruder assembly, and at least one pellet feeder, wherein:
the heated build chamber is defined by a movable portal coupled to the frame and at least one corrugated insulation sheet coupled to the portal and configured to expand and contract with vertical movement of the portal, and the at least one corrugated insulation sheet comprises a composite fabric material containing aluminum and a rubberized plastic, and/or
a top of the heated build chamber comprises a glass insulation with aluminum and rubberized plastic additives; and
performing a print operation using the 3D printer, the print operation comprising moving the extruder assembly within the heated build chamber and feeding, by the at least one pellet feeder, pellets of work material to the extruder assembly.

9. The method of claim 8, further comprising displaying operating information of the 3D printer by at least one display element disposed on an external area of the 3D printer.

10. The method of claim 8, the method further comprising vertically moving the portal and expanding and contracting the at least one corrugated insulation sheet with vertical movement of the portal.

11. The method of claim 8, further comprising forming a vacuum within at least one vacuum channel within a top side surface of the heated print bed by at least one vacuum tank coupled to a bottom side of the heated print bed.

12. The method of claim 11, wherein the heated print bed further comprises at least one vacuum generator and at least one vacuum feeding line coupling to the at least one vacuum generator with the at least one vacuum tank.

* * * * *